US010670557B2

(12) United States Patent
Wakao et al.

(10) Patent No.: US 10,670,557 B2
(45) Date of Patent: *Jun. 2, 2020

(54) GAS DETECTOR

(71) Applicant: Toyota Jidosha Kabushiki Kaisha, Toyota-shi, Aichi-ken (JP)

(72) Inventors: Kazuhiro Wakao, Susono (JP); Keiichiro Aoki, Shizuoka-ken (JP); Kazuhisa Matsuda, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 283 days.

This patent is subject to a terminal disclaimer.

(21) Appl. No.: 15/796,240

(22) Filed: Oct. 27, 2017

(65) Prior Publication Data

US 2018/0149618 A1    May 31, 2018

(30) Foreign Application Priority Data

Nov. 30, 2016   (JP) ................. 2016-233378

(51) Int. Cl.
| | |
|---|---|
| *G01N 27/407* | (2006.01) |
| *G01N 27/416* | (2006.01) |
| *G01N 27/406* | (2006.01) |
| *G01N 27/30* | (2006.01) |

(52) U.S. Cl.
CPC ....... *G01N 27/4162* (2013.01); *G01N 27/304* (2013.01); *G01N 27/407* (2013.01); *G01N 27/4065* (2013.01); *F01N 2560/027* (2013.01)

(58) Field of Classification Search
CPC ............. G01N 27/407; G01N 27/4074; G01N 27/4065; F01N 2560/027
See application file for complete search history.

(56) References Cited

U.S. PATENT DOCUMENTS

| | | | |
|---|---|---|---|
| 6,083,370 A | 7/2000 | Kato et al. | |
| 2002/0043460 A1 | 4/2002 | Ikeda | |
| 2006/0236677 A1 | 10/2006 | Inagaki et al. | |

FOREIGN PATENT DOCUMENTS

| | | |
|---|---|---|
| CN | 105675691 A | 6/2016 |
| JP | H10232220 A | 9/1998 |
| JP | 2002-071633 A | 3/2002 |

(Continued)

OTHER PUBLICATIONS

U.S. Appl. No. 15/796,219, filed Oct. 27, 2017 Inventors: Keiichiro Aoki et al.

(Continued)

*Primary Examiner* — Alexander S Noguerola
(74) *Attorney, Agent, or Firm* — Dinsmore & Shohl LLP

(57) ABSTRACT

A gas detector includes a measurement control section that controls a voltage application section, obtains an output current flowing between a first electrode and a second electrode of an electrochemical cell, and detects a concentration of sulfur oxides in exhaust gas based on the output current. The measurement control section uses a minimum value of the output current obtained by using a current detection section in a period in which lowering sweep is executed and in which an applied voltage is a voltage within a detection voltage range that is equal to or lower than a decomposition initiation voltage of sulfur oxides as a parameter used for detection of the concentration of sulfur oxides.

10 Claims, 11 Drawing Sheets

(56) References Cited

FOREIGN PATENT DOCUMENTS

| | | |
|---|---|---|
| JP | 2009-053108 A | 3/2009 |
| JP | 2014-142199 A | 8/2014 |
| JP | 2015-017931 A | 1/2015 |
| WO | 2015/124992 A1 | 8/2015 |
| WO | WO 2015124985 A1 * | 8/2015 ........... G01N 27/407 |

OTHER PUBLICATIONS

Office Action issued to U.S. Appl. No. 15/796,219 dated Feb. 5, 2020.

* cited by examiner

FIG. 12

| AIR-FUEL RATIO CORRELATION VALUE SFA | MINIMUM CURRENT Ismn | SOx CONCENTRATION |
|---|---|---|
| AF1 | Ismn1 | Ds11 |
|  | Ismn2 | Ds12 |
|  | ⋮ | ⋮ |
|  | IsmnN | Ds1N |
| AF2 | Ismn1 | Ds21 |
|  | Ismn2 | Ds22 |
|  | ⋮ | ⋮ |
|  | IsmnN | Ds2N |
| ⋮ | ⋮ | ⋮ |
| AFM | Ismn1 | DsM1 |
|  | Ismn2 | DsM2 |
|  | ⋮ | ⋮ |
|  | IsmnN | DsMN |

GAS DETECTOR

CROSS-REFERENCE TO RELATED APPLICATIONS

This application claims priority to Japanese Patent Application No. 2016-233378 filed on Nov. 30, 2016, which is incorporated herein by reference in its entirety.

BACKGROUND

1. Technical Field

The disclosure relates to a gas detector capable of determining presence or absence of sulfur oxides in a predetermined concentration or higher that are contained in exhaust gas (detected gas) of an internal combustion engine or detecting a concentration of sulfur oxides contained in the exhaust gas.

2. Description of Related Art

Conventionally, in order to control an internal combustion engine, an air-fuel ratio sensor (also referred to as an "A/F sensor") that obtains an air-fuel ratio (A/F) of air mixture in a combustion chamber based on a concentration of oxygen ($O_2$) contained in exhaust gas has widely been used. One type of such an air-fuel ratio sensor is a limiting current type gas sensor.

Furthermore, a SOx concentration detector (hereinafter referred to as a "conventional device") that detects a concentration of sulfur oxides (hereinafter may also be referred to as "SOx") in the exhaust gas by using such a limiting current type gas sensor has been proposed (for example, see Japanese Patent Application Publication No. 2015-17931 (JP 2015-17931 A)).

The conventional device includes a sensing cell (an electrochemical cell) that uses an oxygen pumping effect of an oxygen ion conductive solid electrolyte. The conventional device applies a voltage between paired electrodes of the sensing cell to decompose gas components including oxygen atoms in the exhaust gas (for example, $O_2$, SOx, $H_2O$, and the like, and hereinafter also referred to as "oxygen containing components"), and thereby generates oxide ions ($O^{2-}$). The conventional device detects a characteristic of the current flowing between the electrodes of the sensing cell when the oxide ions, which are generated through decomposition of the oxygen containing components, move between the electrodes (the oxygen pumping effect).

More specifically, the conventional device executes applied voltage sweep when detecting the SOx concentration. That is, the conventional device executes the applied voltage sweep for boosting the applied voltage, which is applied to the sensing cell, from 0.4 V to 0.8 V and then lowering the applied voltage from 0.8 V to 0.4 V.

The conventional device uses a difference between a reference current as the "current flowing between the electrodes of the sensing cell (hereinafter may be referred to as an "electrode current" or an "output current")" at a time point at which the applied voltage reaches 0.8 V and a peak value as a minimum value of the output current in a period in which the applied voltage is lowered from 0.8 V to 0.4 V, so as to compute the SOx concentration.

SUMMARY

However, there is a high possibility that the above output current is changed under an influence of the oxygen containing component other than SOx contained in the exhaust gas. For example, a decomposition voltage of water ($H_2O$) is approximately the same as or slightly higher than a decomposition voltage of sulfur oxides. Furthermore, a concentration of water in the exhaust gas fluctuates in accordance with the air-fuel ratio of the air mixture, for example. For this reason, it is difficult to eliminate the influence on the output current resulted from the decomposition of water and to detect the output current only resulted from the decomposition of SOx components. Accordingly, it has been desired to determine whether sulfur oxides in a predetermined concentration or higher exist in the exhaust gas or to detect the concentration of sulfur oxides in the exhaust gas by using a "a change in the output current that is not influenced by the oxygen containing components other than SOx and that is only caused by the SOx components".

In view of the above-described problem, the disclosure provides a gas detector capable of accurately determining whether sulfur oxides in a predetermined concentration or higher are contained in exhaust gas or detecting a concentration of sulfur oxides in the exhaust gas.

According to one aspect of the disclosure, a gas detector that includes an electrochemical cell, a diffusion resistance body, an element section, a voltage application section, a current detection section, and an electronic control unit is provided. The electrochemical cell is provided in an exhaust passage of an internal combustion engine and includes a solid electrolyte body having oxide ion conductivity, and a first electrode and a second electrode provided on each of surfaces of the solid electrolyte body. The diffusion resistance body is formed of a porous material through which exhaust gas flowing through the exhaust passage can pass. The element section is configured to make the exhaust gas flowing through the exhaust passage reach the first electrode through the diffusion resistance body. The voltage application section is configured to apply a voltage between the first electrode and the second electrode. The current detection section is configured to detect an output current as a current flowing between the first electrode and the second electrode. The electronic control unit is configured to: (i) control an applied voltage as the voltage applied between the first electrode and the second electrode by using the voltage application section; (ii) obtain the output current by using the current detection section; (iii) determine whether sulfur oxides in a predetermined concentration or higher are contained in the exhaust gas or detect a concentration of sulfur oxides in the exhaust gas based on the obtained output current; (iv) execute boosting sweep for boosting the applied voltage from a first voltage to a second voltage by using the voltage application section when an air-fuel ratio of air mixture supplied to the internal combustion engine is in a stable state, the first voltage being selected from a first voltage range that is lower than a decomposition initiation voltage of sulfur oxides, and the second voltage being selected from a second voltage range that is higher than the decomposition initiation voltage of sulfur oxides; (v) execute lowering sweep for lowering the applied voltage from the second voltage to the first voltage at a predetermined lowering rate after executing the boosting sweep, and obtain a parameter that is correlated with a degree of a change in the output current based on the output current, the change being occurred to the output current resulted from a current flowing between the first electrode and the second electrode due to a reoxidation reaction of sulfur, which has been adsorbed to the first electrode, leading to return to the sulfur oxides at a time when the applied voltage becomes lower than the decomposition initiation voltage of the sulfur oxides during the lowering sweep, and the change being increased as the concentration of sulfur oxides contained in the exhaust gas is increased; (vi) determine whether the sulfur oxides in the predetermined concentration or higher are contained in the exhaust gas or detect the concentration of sulfur oxides in the exhaust gas based on the parameter; (vii) set the predetermined lowering rate to such a rate that a rate of the reoxidation reaction becomes a rapidly increased rate at a time point at which the applied voltage becomes a voltage that falls within the first voltage range and falls within a higher voltage range than the first voltage; and (viii) use, as the parameter, a minimum value of the output current obtained by the current detection section in a period in which the lowering sweep is executed and in which the applied voltage is a voltage within a detection voltage range between not less than a fourth voltage and not more than a third voltage, the third voltage being equal to or lower than the decomposition initiation voltage of sulfur oxides, and the fourth voltage being higher than the first voltage.

According to the investigation by the inventors, it has been found that a "change in the output current" that is less likely to be influenced by "oxygen containing components other than sulfur oxides" resulted from a reoxidation reaction of "sulfur adsorbed to the first electrode during the lowering sweep" in the first electrode leading to generation of sulfur oxides occurs. Furthermore, it has been found that a degree of this "change in the output current" is significantly changed by a voltage lowering amount (that is, a lowering rate) per predetermined elapsed time during the lowering sweep. A mechanism of causing such phenomena is estimated as follows.

More specifically, during the lowering sweep, the reoxidation reaction of sulfur (decomposed matters of sulfur oxides), which has been adsorbed to the first electrode by the boosting sweep, leads to the generation of sulfur oxides in the first electrode. When the boosting sweep is executed, the "decomposed matters of the oxygen containing components other than sulfur oxides (for example, hydrogen as a decomposed matter of water)" are not adsorbed to the first electrode. Accordingly, such a phenomenon that the reoxidation reaction of the decomposed matters of the oxygen containing components other than sulfur oxides leads to generation of the oxygen containing components in the first electrode during the lowering sweep does not substantially occur.

Thus, the "change in the output current" that is resulted from the reoxidation reaction of sulfur, which has been adsorbed to the first electrode during the lowering sweep, in the first electrode leading to the generation of sulfur oxides is less likely to be influenced by the oxygen containing components other than sulfur oxides. That is, the "change in the output current" that is less likely to be influenced by the oxygen containing components other than sulfur oxides during the lowering sweep occurs.

However, when the lowering rate (a sweeping rate) of the lowering sweep is lower than a certain rate, the reoxidation reaction of sulfur is continuously and gradually progressed during the lowering sweep. Accordingly, regardless of the concentration of sulfur oxides, the degree of the "change in the output current" is less likely to appear.

On the other hand, when the lowering rate of the lowering sweep is increased to be higher than the certain rate, the applied voltage is lowered while the reoxidation reaction of sulfur is not significantly progressed during the lowering sweep. Then, when the applied voltage becomes a voltage that falls within "a voltage range where the reoxidation reaction of sulfur becomes active (that is, a predetermined voltage range that is lower than the decomposition initiation voltage of sulfur oxides)", the reoxidation reaction of sulfur is rapidly progressed. As a result, as the concentration of sulfur oxides is increased, the degree of the change in the output current is increased. That is, the current change, which yields a significant effect on accurate detection of the concentration of sulfur oxides, appears.

According to the above, the lowering rate in the lowering sweep by the gas detector is set to such a "rate that the rate of the reoxidation reaction of sulfur is rapidly increased at a time point at which the applied voltage becomes a voltage that falls within the first voltage range (a voltage range that is lower than the decomposition initiation voltage of sulfur oxides) and that falls within a higher voltage range than the first voltage". Accordingly, the change in the output current that is not influenced by the oxygen containing components other than sulfur oxides appears significantly as the concentration of sulfur oxides is increased.

The gas detector is configured to obtain a parameter, which is correlated with the "degree of the change occurred to the output current" resulted from such a reoxidation reaction of sulfur, based on the output current and to either determine whether sulfur oxides in the predetermined concentration or higher are contained in the exhaust gas or detect the concentration of sulfur oxides in the exhaust gas based on the parameter.

The gas detector adopts a minimum value of the output current in a period in which the lowering sweep is executed and in which the applied voltage becomes a voltage within the above-described detection voltage range (that is, a period in which the reoxidation reaction of sulfur is active) as the parameter that represents the reoxidation current change. For example, it has been found that the output current during the lowering sweep possibly has the minimum value at a time point at which the applied voltage is a voltage that is higher than the decomposition initiation voltage of sulfur oxides. Accordingly, such a minimum value does not accurately represent the concentration of sulfur oxides. Meanwhile, the minimum value of the output current in the period in which the applied voltage is the voltage within the above-described detection voltage range (that is, a period in which the reoxidation reaction of sulfur is active) accurately represents the concentration of sulfur oxides.

Therefore, the gas detector can accurately determine whether sulfur oxides in the predetermined concentration or higher are contained in exhaust gas or accurately detect the concentration of sulfur oxides in the exhaust gas.

The gas detector may be configured to: (i) execute the determination whether the sulfur oxides in the predetermined concentration or higher are contained in the exhaust gas; (ii) determine whether the minimum value is smaller than a predetermined threshold; (iii) determine that the sulfur oxides, whose concentration in the exhaust gas is the predetermined concentration or higher, are contained in the exhaust gas when determining that the minimum value is smaller than the threshold, and; (iv) determine that the sulfur oxides in the predetermined concentration or higher are not contained in the exhaust gas when determining that the minimum value is equal to or larger than the threshold.

According to such a gas detector, it is determined whether sulfur oxides in the predetermined concentration or higher are contained in the exhaust gas by determining whether the above minimum value is smaller than the threshold (a minimum current threshold). Therefore, it is possible to accurately determine whether sulfur oxides in the predetermined concentration or higher are contained in the exhaust gas.

In the gas detector, the electronic control unit may be configured to: (i) set the applied voltage to an air-fuel ratio detection applied voltage by using the voltage application section before making the determination, the air-fuel ratio detection applied voltage being selected from a range where a limiting current of oxygen is generated; (ii) obtain the output current as a limiting current value for oxygen contained in the exhaust gas by using the current detection section when the applied voltage is set to the air-fuel ratio detection applied voltage; and (iii) execute at least one of a decision of the threshold based on the obtained limiting current value and correction of the minimum value based on the limiting current value that is obtained at a time point before the determination on whether the minimum value is smaller than the threshold.

In the case where the above determination on whether sulfur oxides in the predetermined concentration or higher are contained in the exhaust gas, as the oxygen concentration in the exhaust gas at the time is increased (that is, the limiting current value for oxygen contained in the exhaust gas is increased), more oxide ions move between the first electrode and the second electrode due to the reductive decomposition of oxygen. Thus, the above output current is large. Accordingly, even when the concentration of sulfur oxides in the exhaust gas is the same, the minimum value of the above output current is changed in accordance with the oxygen concentration in the exhaust gas during the above determination. Thus, in some embodiments, the above minimum current threshold and/or the "obtained minimum value" used for the above determination is changed based on the "limiting current value for oxygen contained in the exhaust gas" that represents the oxygen concentration in the exhaust gas.

From such a perspective, according to a configuration of the gas detector as described above, the "further appropriate threshold minimum current and/or the further appropriate minimum value" is computed based on the oxygen concentration in the exhaust gas at the time when the determination on whether sulfur oxides in the predetermined concentration or higher are contained in the exhaust gas is made, and those are used for the determination. As a result of this, the determination can further accurately be made.

In the gas detector, the electronic control unit may be configured to: (i) execute the detection the concentration of sulfur oxides in the exhaust gas; and (ii) detect the concentration of sulfur oxides in the exhaust gas based on the minimum value.

According to the gas detector, the concentration of sulfur oxides in the exhaust gas can easily be detected based on the above parameter that is very closely correlated with the concentration of sulfur oxides in the exhaust gas.

In the gas detector, the electronic control unit may be configured to: (i) execute the detection the concentration of sulfur oxides in the exhaust gas; (ii) set the applied voltage to an air-fuel ratio detection applied voltage by using the voltage application section before detecting the concentration of sulfur oxides, the air-fuel ratio detection applied voltage being selected from a range where a limiting current of oxygen is generated; (iii) obtain the output current as a limiting current value with respect to oxygen contained in the exhaust gas by using the current detection section when the applied voltage is set to the air-fuel ratio detection applied voltage; and (iv) detect the concentration of sulfur oxides in the exhaust gas based on the minimum value, which is obtained as the parameter, and the obtained limiting current value with respect to oxygen.

As an engine air-fuel ratio becomes leaner (that is, the oxygen concentration in the exhaust gas is increased), a larger amount of oxygen is decomposed in the first electrode. Accordingly, an amount of oxide ions that move from the first electrode to the second electrode is increased, and the output current is thereby increased. Accordingly, according to the configuration of the gas detector as described above, the concentration of sulfur oxides is detected with this increase in the output current being taken into consideration. As a result, the concentration of sulfur oxides can further accurately be detected.

In the above description, in order to assist understanding of the disclosure, names and/or reference numerals used in an embodiment, which will be described below, are provided in parentheses for the configuration of the disclosure that corresponds to the embodiment. However, each component of the disclosure is not limited to that in the embodiment defined by the name and/or the reference numeral. The other purposes, the other characteristics, and accompanying advantages of the disclosure will easily be understood from the description of the embodiment of the disclosure with reference to the following drawings.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 12 is a lookup table to which the CPU of the ECU according to another modified example of the gas detector shown in FIG. 1 refers.

DETAILED DESCRIPTION OF EMBODIMENTS

Figure 1:
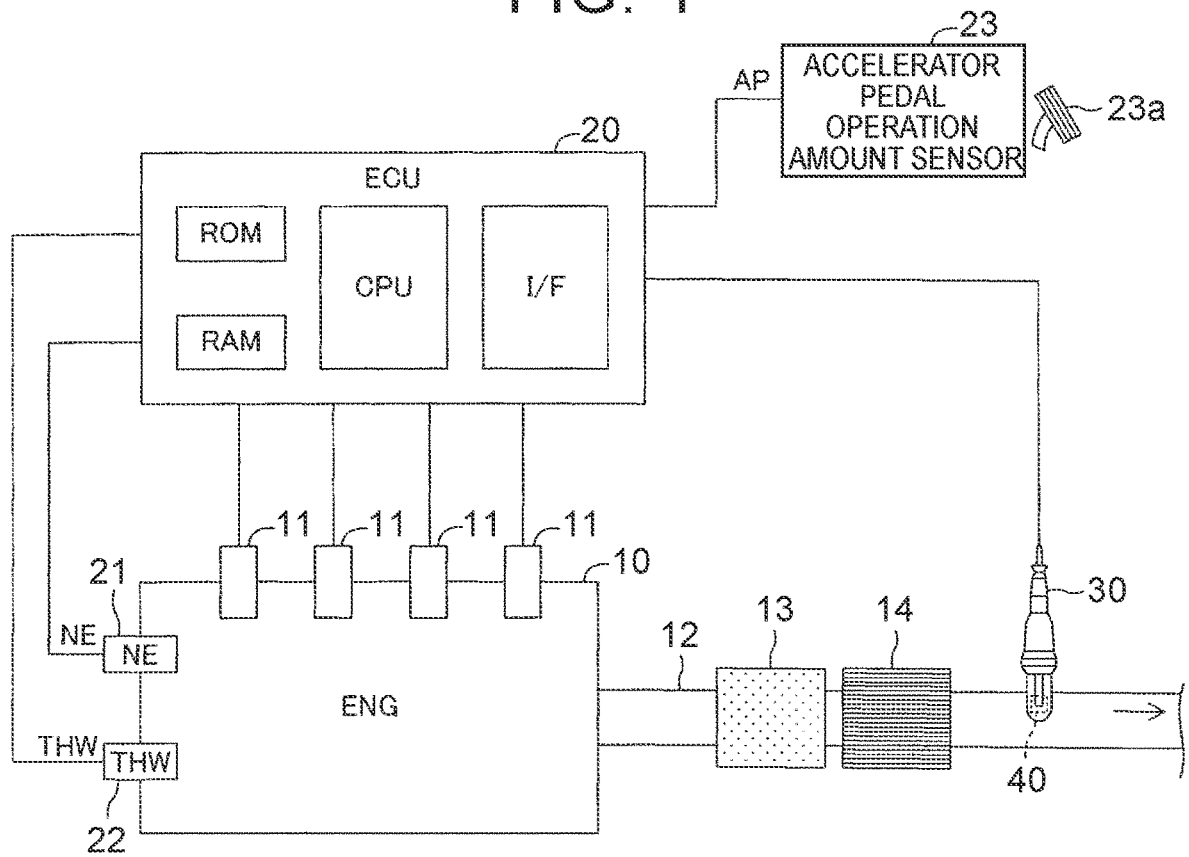
FIG. 1 is a schematic configuration diagram of a gas detector according to an embodiment of the disclosure and an internal combustion engine, to which the gas detector is applied.

A description will hereinafter be made on a gas detector according to an embodiment of the disclosure with reference to the drawings. Note that the same or corresponding portions in all of the drawings of the embodiment are denoted by the same reference numerals.

A description will be made on the gas detector according to the embodiment of the disclosure. This gas detector is applied to a vehicle, which is not shown, and on which an "internal combustion engine 10 shown in FIG. 1" is mounted.

The internal combustion engine 10 is a well-known diesel engine. The internal combustion engine 10 includes a combustion chamber, which is not shown, and a fuel injection valve 11. The fuel injection valve 11 is disposed in a cylinder head section so as to be able to inject fuel into the combustion chamber. The fuel injection valve 11 directly injects the fuel into the combustion chamber in accordance with a command of an ECU 20, which will be described below. An exhaust pipe 12 is connected to an end of an exhaust manifold, which is not shown, and the exhaust manifold is connected to an exhaust port that communicates with the combustion chamber, which is not shown. The exhaust port, the exhaust manifold, and the exhaust pipe 12 constitute an exhaust passage through which exhaust gas discharged from the combustion chamber flows. A diesel oxidation catalyst (DOC) 13 and a diesel particulate filter (DPF) 14 are disposed in the exhaust pipe 12.

The DOC 13 is an exhaust gas control catalyst. More specifically, the DOC 13 has precious metals such as platinum and palladium as catalysts, and oxidizes unburned components (HC, CO) in the exhaust gas to purify the exhaust gas. That is, by the DOC 13, oxidation of HC leads to generation of water and $CO_2$, and oxidation of CO leads to the generation of $CO_2$.

The DPF 14 is arranged on a downstream side of the DOC 13. The DPF 14 is a filter that catches particulates in the exhaust gas. More specifically, the DPF 14 includes plural passages, each of which is formed of a porous material (for example, a partition wall made of cordierite as one type of ceramic, for example). The DPF 14 collects the particulates that are contained in the exhaust gas passing through the partition wall in a pore surface of the partition wall.

This gas detector includes the ECU 20. The ECU 20 is an electronic control circuit having a microcomputer, which includes a CPU, ROM, RAM, backup RAM, and an interface (I/F), as a primary component. The CPU executes an instruction (a routine) stored in memory (the ROM) to realize a predetermined function.

The ECU 20 is connected to various actuators (the fuel injection valve 11 and the like) of the internal combustion engine 10. The ECU 20 sends a drive (command) signal to each of these actuators to control the internal combustion engine 10. Furthermore, the ECU 20 is connected to various types of sensors, which will be described below, and receives signals from these sensors.

An engine speed sensor 21: the engine speed sensor (hereinafter referred to as an "NE sensor") 21 measures a speed (an engine speed) NE of the internal combustion engine 10 and outputs a signal representing this engine speed NE.

A coolant temperature sensor 22: the coolant temperature sensor 22 is disposed in a cylinder block section. The coolant temperature sensor 22 measures a temperature of a coolant (a coolant temperature THW) that cools the internal combustion engine 10, and outputs a signal representing this coolant temperature THW.

An accelerator pedal operation amount sensor 23: the accelerator pedal operation amount sensor 23 detects an operation amount (an accelerator operation amount) of an accelerator pedal 23a of the vehicle and outputs a signal representing an accelerator pedal operation amount AP.

A gas sensor 30: the gas sensor 30 is a limiting current type gas sensor of one cell type and is disposed in the exhaust pipe 12 that constitutes the exhaust passage of the engine 10. The gas sensor 30 is disposed on a downstream side of the DOC 13 and the DPF 14 that are installed in the exhaust pipe 12.

Figure 2:
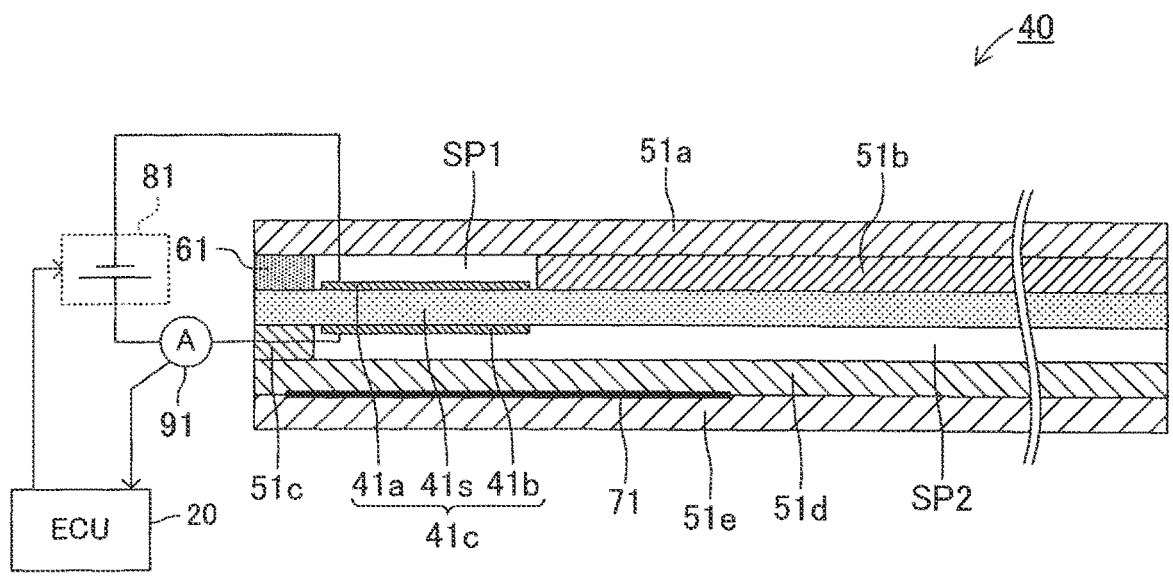
FIG. 2 is a schematic cross-sectional view of one configuration example of an element section of a gas sensor shown in FIG. 1.

Next, a description will be made on a configuration of the gas sensor 30 with reference to FIG. 2. An element section 40 that is provided in the gas sensor 30 includes a solid electrolyte body 41s, a first alumina layer 51a, a second alumina layer 51b, a third alumina layer 51c, a fourth alumina layer 51d, a fifth alumina layer 51e, a diffusion resistance section (a diffusion-controlled layer) 61, and a heater 71.

The solid electrolyte body 41s is a thin plate body that contains zirconia and the like and has oxide ion conductivity. Zirconia that forms the solid electrolyte body 41s may contain elements such as scandium (Sc) and yttrium (Y).

Each of the first to fifth alumina layers 51a to 51e is a dense (gas impermeable) layer (a dense thin plate body) that contains alumina.

The diffusion resistance section 61 is a porous diffusion-controlled layer and is a gas-permeable layer (a thin plate body). The heater 71 is a thin cermet plate body that contains platinum (Pt) and ceramic (for example, alumina or the like), for example, and is a heat generation body that generates heat by energization. The heater 71 is connected to a power supply, which is not shown and is mounted on the vehicle, by lead wire, which is not shown. The heater 71 can change a heat generation amount when the ECU 20 controls an "amount of power supplied from the power supply".

The layers of the element section 40 are stacked in an order of the fifth alumina layer 51e, the fourth alumina layer 51d, the third alumina layer 51c, the solid electrolyte body 41s, the diffusion resistance section 61 and the second alumina layer 51b, and the first alumina layer 51a from below.

An internal space SP1 is a space that is formed by the first alumina layer 51a, the solid electrolyte body 41s, the diffusion resistance section 61, and the second alumina layer 51b, and the exhaust gas of the internal combustion engine 10 as detected gas is introduced thereinto via the diffusion resistance section 61. That is, the internal space SP1 communicates with the inside of the exhaust pipe 12 of the internal combustion engine 10 via the diffusion resistance section 61. Accordingly, the exhaust gas in the exhaust pipe 12 is led as the detected gas into the internal space SP1.

A first atmosphere intake passage SP2 is formed by the solid electrolyte body 41s, the third alumina layer 51c, and the fourth alumina layer 51d and is exposed to the atmosphere outside the exhaust pipe 12.

A first electrode 41a is fixed to a surface on one side of the solid electrolyte body 41s (more specifically, a surface of the solid electrolyte body 41s that defines the internal space SP1). The first electrode 41a is a negative electrode. The first electrode 41a is a porous cermet electrode that contains platinum (Pt) as a primary component.

A second electrode 41b is fixed to a surface on the other side of the solid electrolyte body 41s (more specifically, a surface of the solid electrolyte body 41s that defines the first atmosphere intake passage SP2). The second electrode 41b is a positive electrode. The second electrode 41b is a porous cermet electrode that contains platinum (Pt) as a primary component.

The first electrode 41a and the second electrode 41b are arranged to oppose each other with the solid electrolyte body 41s being interposed therebetween. That is, the first electrode 41a, the second electrode 41b, and the solid electrolyte body 41s constitute an electrochemical cell 41c that has oxygen discharging capacity realized by an oxygen pumping effect. The electrochemical cell 41c is heated to an activation temperature by the heater 71.

Each layer of the solid electrolyte body 41s and the first to fifth alumina layers 51a to 51e is molded in a sheet shape by a doctor blade method, an extrusion method, or the like, for example. The first electrode 41a, the second electrode 41b, wires used to energize these electrodes, and the like are each formed by a screen printing method, for example. These sheets are stacked as described above and are calcined. In this way, the element section 40 with the structure as described above is integrally manufactured.

Note that the material constituting the first electrode 41a is not limited to the above material but can be selected from a material that contains a platinum group element such as platinum (Pt), rhodium (Rh), or palladium (Pd), an alloy thereof, or the like as a primary component. However, the material constituting the first electrode 41a is not particularly limited as long as SOx contained in the exhaust gas, which is led to the internal space SP1 via the diffusion resistance section 61, can be subjected to reductive decomposition when a voltage that is equal to or higher than a SOx decomposition initiation voltage (more specifically, a voltage of approximately 0.6 V or higher) is applied between the first electrode 41a and the second electrode 41b.

The gas sensor 30 further includes a power supply circuit 81 and an ammeter 91. The power supply circuit 81 and the ammeter 91 are connected to the above-described ECU 20. The ammeter 91 is one example of the "current detection section" of the disclosure.

The power supply circuit 81 can apply a predetermined voltage (hereinafter also referred to as an "applied voltage Vm") between the first electrode 41a and the second electrode 41b such that an electric potential of the second electrode 41b is higher than an electric potential of the first electrode 41a. The power supply circuit 81 can change the applied voltage Vm when being controlled by the ECU 20.

The ammeter 91 measures an output current (an electrode current) Im as that is a current flowing between the first electrode 41a and the second electrode 41b (thus, a current flowing through the solid electrolyte body 41s), and outputs a measurement value to the ECU 20.

Next, a description will be made on an overview of actuation of this gas detector. This gas detector is configured to detect an oxygen concentration in the exhaust gas (the detected gas) that is discharged from the internal combustion engine 10. This gas detector is configured to detect an air-fuel ratio (A/F) of air mixture in the combustion chamber of the internal combustion engine 10 based on the oxygen concentration in the exhaust gas. The air-fuel ratio of the air mixture in the combustion chamber of the internal combustion engine 10 will hereinafter also be referred to as an "engine air-fuel ratio A/F". Furthermore, this gas detector is configured to determine presence or absence of SOx in a predetermined concentration or higher that is contained in the exhaust gas. Because several seconds are required from initiation of detection of the presence or the absence of SOx to termination of the detection thereof, this gas detector is configured to determine the presence or the absence of SOx in the predetermined concentration or higher in a state where the engine air-fuel ratio A/F is stable (in the case where the engine 10 can be operated in a manner to stabilize the engine air-fuel ratio A/F).

Figure 3A:
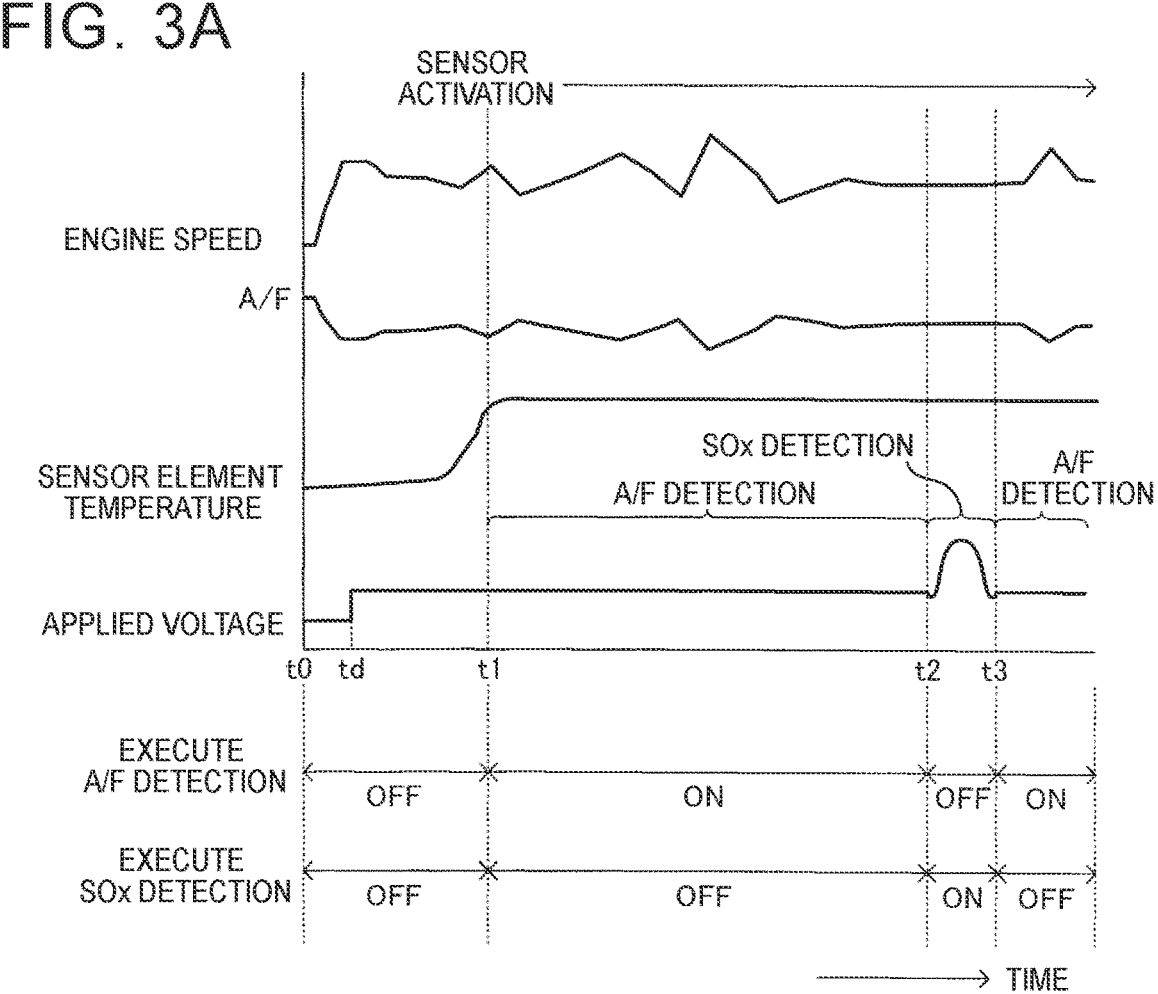
FIG. 3A is a time chart that illustrates an overview of actuation of the gas detector according to the embodiment of the disclosure.

More specifically, as shown in FIG. 3A, at time t0 as a time point at which the internal combustion engine 10 is started, this gas detector starts controlling the heater 71 such that the solid electrolyte body 41s is heated by the heater 71. In this way, a temperature of the solid electrolyte body 41s is increased to a predetermined temperature that is equal to or higher than a temperature at which the oxide ion conductivity appears (hereinafter may also be referred to as the "activation temperature").

At time t1, the temperature of the solid electrolyte body 41s (a sensor element temperature) becomes equal to or higher than the activation temperature, and the gas sensor 30 is brought into a sensor active state. At this time, this gas detector starts processing to detect the oxygen concentration in the exhaust gas and obtain the engine air-fuel ratio A/F based on the oxygen concentration. Note that, at time td as a time point between the time t0 and the time t1, this gas detector starts applying an oxygen concentration (A/F) detection voltage (more specifically, 0.3 V), which is appropriate for the detection of the oxygen concentration, between the first electrode 41a and the second electrode 41b. That is, this gas detector sets the applied voltage Vm to the oxygen concentration detection voltage. In the case where this applied voltage Vm is set to the oxygen concentration detection voltage when the temperature of the solid electrolyte body 41s is equal to or higher than the activation temperature, oxygen molecules are decomposed, and the oxygen pumping effect appears. However, the gas of the oxygen containing components (including SOx) is not decomposed except for oxygen.

This gas detector successively detects the oxygen concentration from the time t1 and thereby monitors the engine air-fuel ratio A/F. Then, when a SOx detection initiation condition is satisfied (that is, when the engine air-fuel ratio A/F is brought into a stable state and the other conditions, which will be described below, are satisfied) at the time t2, this gas detector starts the processing to detect the SOx concentration in the exhaust gas. Note that, in this specification, the detection of the SOx concentration indicates both of the detection (measurement) of the SOx concentration itself in the exhaust gas and obtainment of a parameter that represents the SOx concentration in the exhaust gas. As will be described below, this gas detector obtains the parameter that represents the SOx concentration in the exhaust gas (a parameter that varies in accordance with the SOx concentration), and uses the parameter to determine whether SOx in the predetermined concentration or higher is contained in the exhaust gas. Note that, as the predetermined concentration, a concentration that is higher than 0 and that corresponds to a desired detection level is selected.

That is, in a period from the time t1 to time immediately before the time t2, this gas detector detects the engine air-fuel ratio A/F and stops detecting the engine air-fuel ratio A/F at the time t2 as a time point at which this gas detector starts detecting the SOx concentration.

In a period from the time t2 to time immediately before time t3, this gas detector executes applied voltage sweep within a predetermined applied voltage range. More specifically, after executing "boosting sweep for gradually boosting the applied voltage Vm from a first voltage V1 to a second voltage V2", this gas detector executes "lowering sweep for gradually lowering the applied voltage Vm from the second voltage V2 to the first voltage V1". This gas detector executes one cycle of the applied voltage sweep that includes one time of the boosting sweep and one time of the lowering sweep as one cycle. However, this gas detector may execute the plural cycles of the applied voltage sweep.

Figure 3B:
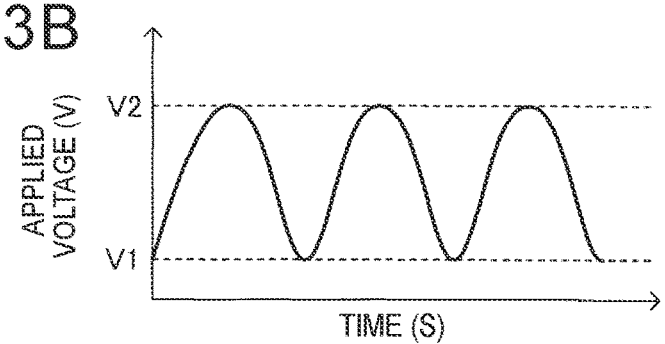
FIG. 3B is a graph that shows a waveform of an applied voltage at a time when SOx detection is executed by the gas detector according to the embodiment of the disclosure.

More specifically, this gas detector executes the applied voltage sweep by applying a voltage with one cycle of a sine waveform shown in FIG. 3B between the first electrode 41a and the second electrode 41b. Note that the voltage waveform in this case is not limited to the sine wave shown in FIG. 3B and any of various waveforms can be adopted therefor. For example, the voltage waveform in this case may be a non-sine wave as indicated in a graph of FIG. 3C (a waveform such as the voltage waveform during charging/discharging of a capacitor).

When terminating the detection of SOx concentration at the time t3, this gas detector resumes the processing to detect the engine air-fuel ratio A/F. That is, this gas detector sets the applied voltage Vm to the oxygen concentration detection voltage (0.3 V) at the time t3.

Next, a description will be made on the actuation of this gas detector at the time when this gas detector detects the above-described engine air-fuel ratio A/F. When the gas sensor 30 is brought into the sensor active state, in order to obtain the engine air-fuel ratio A/F, this gas detector sets the applied voltage Vm to the oxygen concentration detection voltage (for example, 0.3 V) such that the first electrode 41a has the low electric potential and the second electrode 41b has the high electric potential. That is, the first electrode 41a functions as the negative electrode, and the second electrode 41b functions as the positive electrode. The oxygen concentration detection voltage is set to be a voltage that is equal to or higher than a voltage (the decomposition initiation voltage) at which the decomposition of oxygen ($O_2$) is started in the first electrode 41a and that is lower than the decomposition initiation voltages of the oxygen containing components other than oxygen. In this way, oxygen contained in the exhaust gas is subjected to the reductive decomposition in the first electrode 41a, which leads to generation of oxide ions ($O^{2-}$).

These oxide ions are conducted to the second electrode 41b via the above solid electrolyte body 41s, become oxygen ($O_2$), and is discharged to the atmosphere through the first atmosphere intake passage SP2. As described above, such movement of oxygen by the conduction of the oxide ions from the negative electrode (the first electrode 41a) to the positive electrode (the second electrode 41b) via the solid electrolyte body 41s is referred to as the "oxygen pumping effect".

Due to the conduction of the oxide ions associated with this oxygen pumping effect, the current flows between the first electrode 41a and the second electrode 41b. The current that flows between the first electrode 41a and the second electrode 41b is referred to as the "output current Im (or the electrode current Im)". In general, the output current Im has a tendency of being increased as the applied voltage Vm is boosted. However, because a flow rate of the exhaust gas that reaches the first electrode 41a is restricted by the diffusion resistance section 61, an oxygen consumption rate that is associated with the oxygen pumping effect eventually exceeds an oxygen supply rate to the first electrode 41a. That is, an oxygen reductive decomposition reaction in the first electrode 41a (the negative electrode) is brought into a diffusion-controlled state.

Once the oxygen reductive decomposition reaction in the first electrode 41a is brought into the diffusion-controlled state, the output current Im is not increased even when the applied voltage Vm is boosted, and remains to be substantially constant. Such a characteristic is referred to as a "limiting current characteristic". A range of the applied voltage where the limiting current characteristic appears (is observed) is referred to as a "limiting current range". Furthermore, the output current Im within the limiting current range is referred to as a "limiting current". A magnitude of the limiting current (a limiting current value) for oxygen corresponds to the oxygen supply rate to the first electrode 41a (the negative electrode). As described above, because the flow rate of the exhaust gas that reaches the first electrode 41a is maintained to be constant by the diffusion resistance section 61, the oxygen supply rate to the first electrode 41a corresponds to the concentration of oxygen contained in the exhaust gas.

Accordingly, in the gas sensor 30, the output current (the limiting current) Im at the time when the applied voltage Vm is set to the "oxygen concentration detection voltage as a predetermined voltage (more specifically, 0.3 V) within the limiting current range of oxygen" corresponds to the concentration of oxygen contained in the exhaust gas. By using the limiting current characteristic of oxygen, just as described, this gas detector detects the concentration of oxygen contained in the exhaust gas as the detected gas. That is, this gas detector stores a relationship between the limiting current of oxygen and the oxygen concentration in the ROM in advance and detects the oxygen concentration in the exhaust gas based on the relationship and the detected limiting current of oxygen. Meanwhile, the engine air-fuel ratio A/F and the oxygen concentration in the exhaust gas establish a one-on-one relationship. Accordingly, this gas detector stores this relationship in the ROM in advance and detects the engine air-fuel ratio A/F based on this relationship and the detected oxygen concentration. Note that this gas detector may store a relationship between the limiting current of oxygen and the engine air-fuel ratio A/F in the ROM in advance and may obtain the engine air-fuel ratio A/F based on the relationship and the limiting current of oxygen.

Next, a description will be made on a method for detecting the SOx concentration in the exhaust gas. The above-described oxygen pumping effect is also exhibited by the oxygen containing components, such as "SOx (sulfur oxides) and $H_2O$ (water)", that contain the oxygen atoms in the molecules. That is, when a voltage that is equal to or higher than the decomposition initiation voltage of each of these compounds is applied between the first electrode 41a and the second electrode 41b, each of these compounds is subjected to the reductive decomposition, which leads to the generation of the oxide ions. These oxide ions are conducted from the first electrode 41a to the second electrode 41b by the "oxygen pumping effect". In this way, the output current Im flows between the first electrode 41a and the second electrode 41b.

However, the concentration of SOx that is contained in the exhaust gas is extremely low, and thus the current resulted from the decomposition of SOx is extremely small. Furthermore, the current resulted from the decomposition of each of the oxygen containing components other than SOx (for example, water, carbon dioxide, and the like) also flows between the first electrode 41a and the second electrode 41b. Thus, it is difficult to accurately detect only the output current resulted from SOx.

In view of the above, as the result of the earnest investigation, the inventors of the present application has reached findings that the SOx concentration can accurately be detected by executing the applied voltage sweep that has the boosting sweep and the "lowering sweep at a predetermined sweeping rate" as one cycle at a time when the SOx concentration is detected.

The boosting sweep is processing to gradually boost the applied voltage Vm from the first voltage V1 to the second voltage V2. The lowering sweep is processing to gradually lower the applied voltage Vm from the second voltage V2 to the first voltage V1. Note that the first voltage V1 and the second voltage V2 correspond to the electric potential of the second electrode 41b with the electric potential of the first electrode 41a being a reference and each have a positive voltage value.

The first voltage V1 is set to a voltage within a voltage range (hereinafter also referred to as a "first voltage range") that is lower than the SOx decomposition initiation voltage (approximately 0.6 V) and that is higher than a minimum value of the applied voltage Vm within the limiting current range of oxygen. Because the minimum value of the applied voltage Vm within the limiting current range of oxygen depends on the engine air-fuel ratio A/F (is boosted as the engine air-fuel ratio A/F is increased), a lower limit value of the first voltage range is also desirably changed in accordance with the engine air-fuel ratio A/F. More specifically, the lower limit value of the first voltage range is a voltage within a range from 0.2 V to 0.45 V, for example, and an upper limit voltage of the first voltage range is 0.6 V. That is, the first voltage V1 is a voltage that is selected from a range between not less than 0.2 V and less than 0.6 V.

The second voltage V2 is set to a voltage within a voltage range (hereinafter also referred to as a "second voltage range") that is higher than the SOx decomposition initiation voltage (approximately 0.6 V) and that is lower than an upper limit value (2.0 V) of the voltage, at which the solid electrolyte body 41s is not damaged. That is, the second voltage V2 is a voltage that is selected from a range between more than 0.6 V and not more than 2.0 V.

Figure 4A:
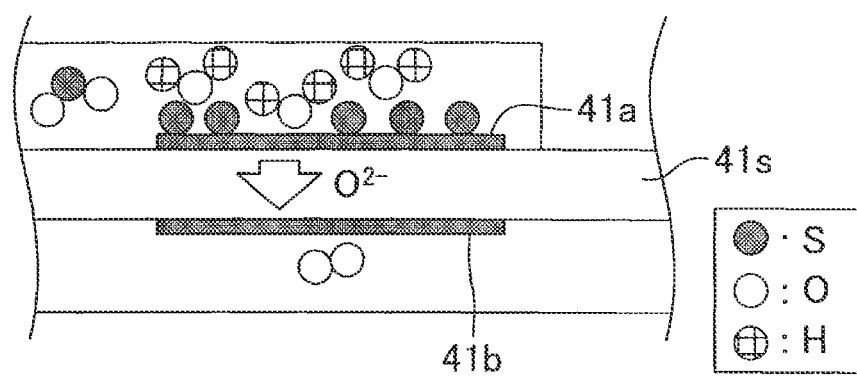
FIG. 4A is a schematic view that illustrates a SOx decomposition reaction occurred in the element section.

In a period in which the boosting sweep is executed, when the applied voltage Vm, which is applied between the first electrode 41a and the second electrode 41b, becomes equal to or higher than the SOx decomposition initiation voltage, as shown in FIG. 4A, the reductive decomposition of SOx contained in the exhaust gas leads to the generation of S and $O^{2-}$ in the first electrode 41a (the negative electrode). As a result, a reductive decomposition product (S (sulfur)) of SOx is adsorbed to the first electrode 41a (the negative electrode).

Figure 4B:
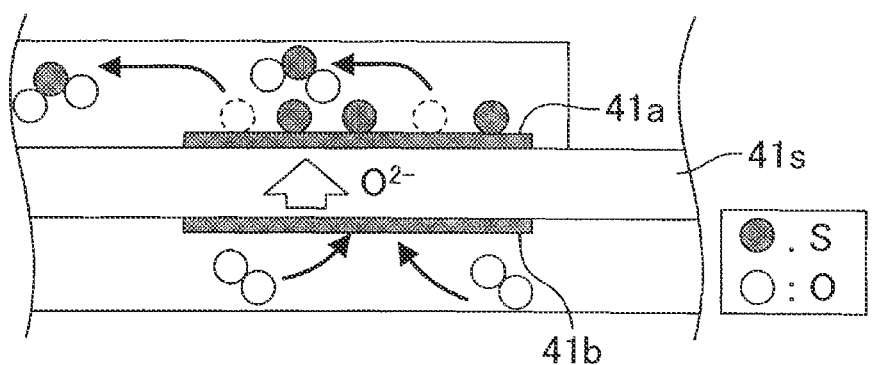
FIG. 4B is a schematic view that illustrates a sulfur reoxidation reaction occurred in the element section.

In a period in which the lowering sweep is executed, when the applied voltage Vm becomes lower than the SOx decomposition initiation voltage, as shown in FIG. 4B, such a reaction that S, which has been adsorbed to the first electrode 41a (the negative electrode), and $O^{2-}$ are reacted to generate SOx occurs (hereinafter this reaction may also be referred to as a "S (sulfur) reoxidation reaction"). At this time, the output current Im is changed as will be described below as a result of the "S reoxidation reaction". Note that this change in the output current Im, which is associated with the "S reoxidation reaction", is referred to as a "reoxidation current change".

By the way, it has been found in the investigation by the inventors that the reoxidation current change, which yields a significant effect on the detection of the SOx concentration, does not always appear depending on the sweeping rate (a voltage lowering amount per predetermined elapsed time) in the lowering sweep. A description will be made on this point with reference to FIG. 5A and FIG. 5B.

Figure 5A:
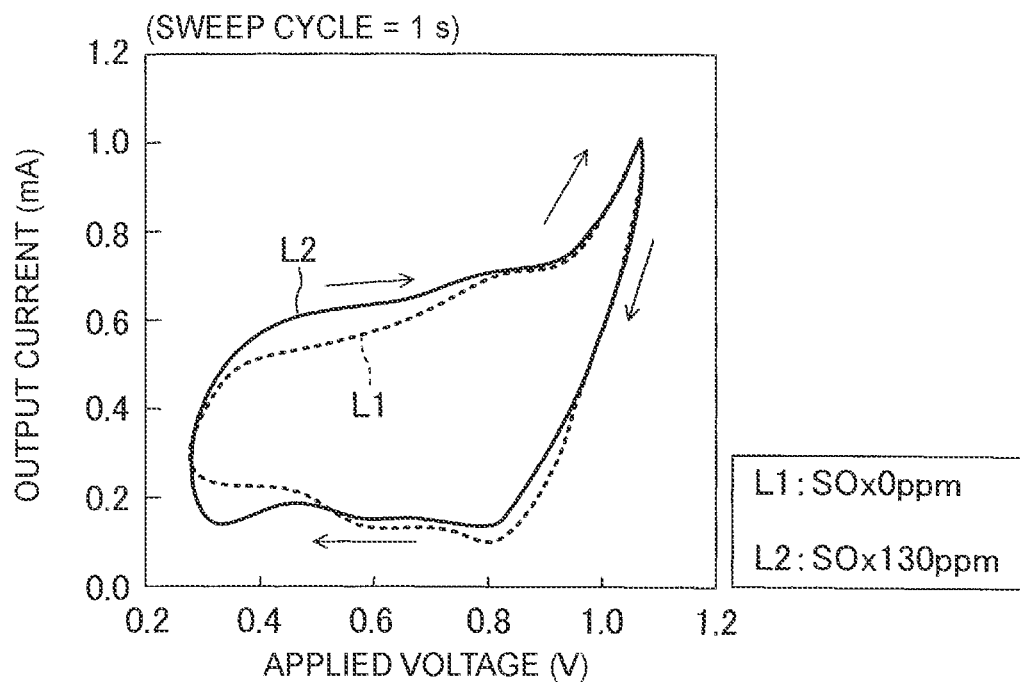
FIG. 5A is a graph that indicates a relationship between the applied voltage and an output current.
Figure 5B:
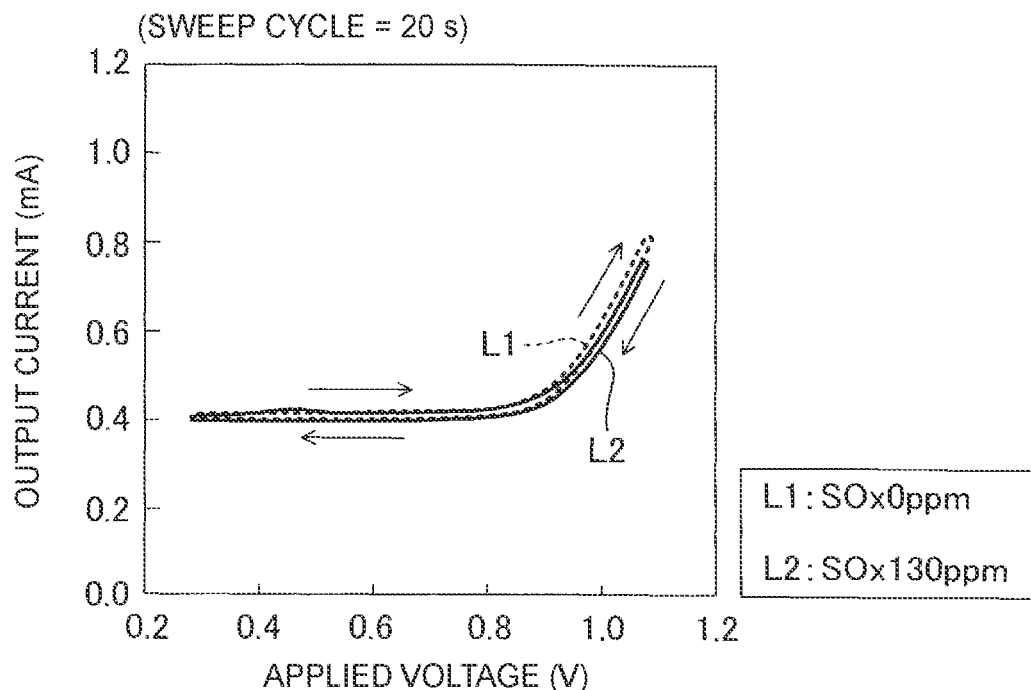
FIG. 5B is a graph that indicates a relationship between the applied voltage and the output current.

FIG. 5A is a schematic graph of a relationship between the applied voltage Vm and the output current Im at a time when a sweep cycle (that is, a sum of time required for the boosting sweep and a time required for the lowering sweep, the cycle of the applied voltage sweep) is set to one second and the applied voltage sweep is executed. FIG. 5B is a schematic graph of a relationship between the applied voltage Vm and the output current Im at a time when the applied voltage sweep is executed at the slower sweeping rate (the sweep cycle of 20 seconds) than that in the example shown in FIG. 5A. Note that the waveform of the applied voltage Vm in this case is the one cycle of the sine waveform shown in FIG. 3B.

When both of the graphs are compared, compared to the example in FIG. 5B, a difference between the "output current Im at a time when the SOx concentration of the detected gas is 0 ppm", which is represented by a line L1, and the "output current Im at a time when the SOx concentration of the detected gas is 130 ppm", which is represented by a line L2, (a difference in the current value) is clearly appeared within the voltage range of less than the SOx decomposition initiation voltage (0.6 V) in the example of FIG. 5A, in which the sweeping rate in the applied voltage sweep is higher than the example of FIG. 5B. That is, the current change (the reoxidation current change) that yields the significant effect on the detection of the SOx concentration appears in the example of FIG. 5A. A mechanism of causing such a phenomenon is considered as follows.

That is, in the case where the sweeping rate is decreased to be lower than a predetermined rate, the S reoxidation reaction is continuously and gradually progressed during the lowering sweep. Thus, the reoxidation current change, which yields the significant effect on the detection of the SOx concentration, does not appear. On the other hand, in the case where the sweeping rate is increased to be higher than the predetermined sweeping rate, the applied voltage Vm is lowered while the S reoxidation reaction is not significantly progressed during the lowering sweep. Then, it is considered that, once the applied voltage Vm becomes a voltage within a "certain voltage range where the S reoxidation reaction is activated", the S reoxidation reaction is rapidly progressed. In this way, the current change that yields the significant effect on the detection of the SOx concentration appears.

Just as described, depending on the sweeping rate during the lowering sweep, a case where the current change that yields the significant effect on the detection of the SOx concentration appears and a case where the current change that yields the significant effect on the detection of the SOx concentration does not appear occur. Accordingly, when the lowering sweep is executed, it is required to set the sweeping rate to the predetermined rate at which the current change yielding the significant effect on the detection of the SOx concentration appears, and such a current change represents the reoxidation current change.

In this gas detector, this predetermined rate is set to an appropriate rate, at which the current change yielding the significant effect on the detection of the SOx concentration appears, by an experiment in advance, and such a current change represents the reoxidation current change.

According to the experiment, it has been found that, when the voltage in the sine waveform shown in FIG. 3B is applied between the first electrode 41a and the second electrode 41b, for example, this predetermined rate is set to a sweeping rate at a frequency F within a predetermined range (typically, a range between not less than 0.1 Hz and not more than 5 Hz). A lower limit value of the frequency F within this predetermined range is defined from such a perspective that a signal difference yielding the significant effect on the detection of the SOx concentration (the reoxidation current change) can no longer be obtained when the frequency F is further lowered. Meanwhile, an upper limit value of the frequency F within this predetermined range is defined from such a perspective that the frequency F further contributes to causes of the current change other than the SOx concentration (more specifically, capacity of the solid electrolyte body 41s, and the like) when the frequency F is further increased.

Figure 3C:
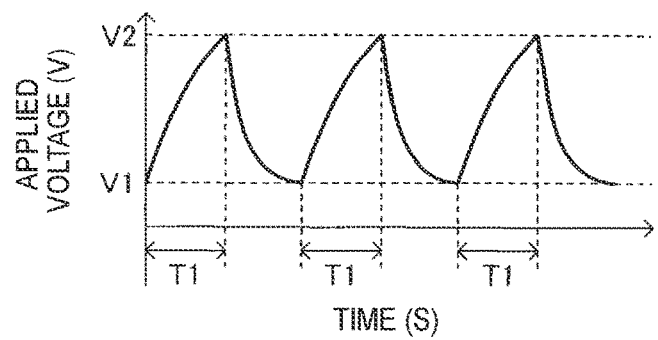
FIG. 3C is a graph that shows a waveform of another applied voltage at a time when SOx detection is executed by the gas detector according to the embodiment of the disclosure.

Meanwhile, according to the experiment, it has been found that, when the voltage in the non-sine waveform, which is associated with charging/discharging of the capacitor, as shown in FIG. 3C is applied between the first electrode 41a and the second electrode 41b, this predetermined rate is set to such a sweeping rate that a response time T1 of a voltage switching waveform falls within a predetermined range (typically, a range between not less than 0.1 second and not more than 5 seconds). Note that the response time T1 corresponds to a time required for the applied voltage Vm to be changed from a lower limit voltage to an upper limit voltage within a predetermined range and vice versa. The lower limit voltage and the upper limit voltage within the predetermined range of the response time T1 are each set to appropriate values from a similar perspective to those in the case where the frequency (the above predetermined frequency) F is determined when the voltage in the above-described sine waveform is used as the applied voltage Vm is determined.

Note that, when the predetermined ranges of the frequency F and the response time T1 described above are each converted to a required time for the lowering sweep (that is, a time required for the applied voltage Vm to reach the first voltage V1 from the second voltage V2), each of the predetermined ranges becomes a range between not less than 0.1 second and not more than 5 seconds. Thus, in some embodiments, the time falls within the range between not less than 0.1 second and not more than 5 seconds.

Furthermore, it has been found that the reoxidation current change primarily depends on the SOx concentration in the exhaust gas. In other words, there is a low possibility that the reoxidation current change is influenced by the "gas of the oxygen containing components (for example, water) other than sulfur oxides (SOx)" in the exhaust gas. That is, when the boosting sweep is executed, decomposed matters (for example, hydrogen as a decomposed matter of water, or the like) of the "oxygen containing components other than sulfur oxides" are not adsorbed to the first electrode 41a. Accordingly, in the period in which the lowering sweep is executed, such a phenomenon that the decomposed matters of the "oxygen containing components other than sulfur oxides" are subjected to the reoxidation reaction in the first electrode 41a and again become the oxygen containing components does not substantially occur.

Thus, the "change in the output current" that occurs when the reoxidation reaction of sulfur, which has been adsorbed to the first electrode 41a, in the first electrode 41a leads to the generation of sulfur oxides during the lowering sweep is less likely to be influenced by the oxygen containing components other than sulfur oxides. That is, the "change in the output current" that is less likely to be influenced by the oxygen containing components other than sulfur oxides occurs.

Furthermore, it has been found that the "change in the output current (the reoxidation current change)" appears to have such a characteristic that the output current Im is decreased as the SOx concentration in the exhaust gas (the detected gas) is increased. That is, when the sulfur reoxidation reaction occurs, as shown in FIG. 4B, the oxide ions are consumed in the first electrode 41a. Thus, an amount of movement of the oxide ions (for example, the oxide ions produced by the decomposition of the oxygen molecules) that move from the first electrode 41a to the second electrode 41b is decreased. In this way, the output current Im is decreased. As the SOx concentration in the exhaust gas is increased, an amount of sulfur that is adsorbed to the first electrode 41a particularly during the boosting sweep is increased. Accordingly, an amount of the oxide ions that is consumed by the reaction with sulfur in the first electrode 41a particularly during the lowering sweep is also increased. As a result, the amount of the oxide ions that move from the first electrode 41a to the second electrode 41b is decreased. Thus, as the SOx concentration in the exhaust gas is increased, the output current Im is decreased.

It is understood from what has been described so far that, when the above-described "reoxidation current change is used, the SOx concentration in the exhaust gas can accurately be detected without being influenced by the gas of the oxygen containing components (for example, water) other than SOx in the exhaust gas". Accordingly, this gas detector detects the SOx concentration (actually, the presence or the absence of SOx in the predetermined concentration or higher) by using this reoxidation current change.

Next, a description will be made on the parameter that is used for the detection of the reoxidation current change. This gas detector obtains a parameter that appropriately (accurately) represents the "reoxidation current change", and detects the SOx concentration based on this parameter. More specifically, this gas detector obtains a minimum value of the output current Im (hereinafter referred to as a "minimum current Ismn" or a "minimum value Ismn") at a time when the applied voltage Vm falls within a "range (the detection voltage range) between not less than a fourth voltage V4, which is higher than the first voltage V1, and not more than a current obtainment initiation voltage (a third voltage) Vsem" during the lowering sweep, and obtains this minimum value of the output current Im as the "parameter that represents the reoxidation current change".

The current obtainment initiation voltage Vsem is selected from a range between more than the lower limit voltage (the first voltage V1) of the lowering sweep and not more than the SOx decomposition initiation voltage (0.6 V). In this example, the current obtainment initiation voltage Vsem is set at 0.6 V. Note that the current obtainment initiation voltage Vsem may differ in accordance with at least one of the applied voltage range and the cycle of the applied voltage sweep (in other words, the sweeping rate of the applied voltage sweep). This gas detector determines whether sulfur oxides in the predetermined concentration or higher exist in the exhaust gas based on this parameter (the minimum current Ismn).

This gas detector obtains the minimum current Ismn by executing the only one cycle of the applied voltage sweep. However, this gas detector may be configured to execute the plural cycles of the applied voltage sweep, obtain the minimum current Ismn in each of the cycles, and use an average value of the obtained "minimum currents Ismn" as the "parameter that represents the reoxidation current change". Furthermore, this gas detector may use a minimum value of the thus-obtained "minimum currents Ismn" as the "parameter that represents the reoxidation current change". Because these parameters have values that are computed based on (that are correlated with) the minimum current Ismn in each of the cycles, these parameters may collectively be referred to as the "minimum value of the output current Im".

Next, a description will be made on a method for detecting the SOx concentration (obtaining the parameter). This gas detector uses detection principle of the SOx concentration, which has been described so far, to detect the SOx concentration and "determine whether sulfur oxides in the predetermined concentration or higher exist in the exhaust gas" as follows. This gas detector executes the applied voltage sweep at the predetermined sweeping rate. In this case, what is especially important is a lowering sweeping rate. At this time, this gas detector determines the voltage range (that is, the first voltage V1 and the second voltage V2) of the applied voltage sweep based on the "limiting current value for oxygen in the exhaust gas" that is obtained immediately before the execution of the applied voltage sweep (thus, the engine air-fuel ratio A/F corresponding to the "oxygen concentration in the exhaust gas", which is detected based on this limiting current value for oxygen). At every predetermined sampling time, this gas detector obtains the output current Im at the time when the applied voltage Vm falls within the detection voltage range (the range between not less than the fourth voltage V4, which is higher than the first voltage V1, and not more than the current obtainment initiation voltage Vsem) during the lowering sweep. Then, this gas detector obtains the minimum value of the output currents Im as the minimum current Ismn. This minimum current Ismn is the parameter that represents the SOx concentration in the exhaust gas. This gas detector determines whether SOx in the predetermined concentration or higher is contained in the exhaust gas based on the minimum current Ismn.

More specifically, when executing the applied voltage sweep for the detection of the SOx concentration, this gas detector applies the one cycle of the voltage in the sine waveform shown in FIG. 3B between the first electrode 41a and the second electrode 41b. At this time, this gas detector executes the applied voltage sweep (the boosting sweep and the lowering sweep) at the above-described "predetermined sweeping rate", at which the current change yielding the significant effect on the already-described detection of the SOx concentration occurs.

Figure 6:
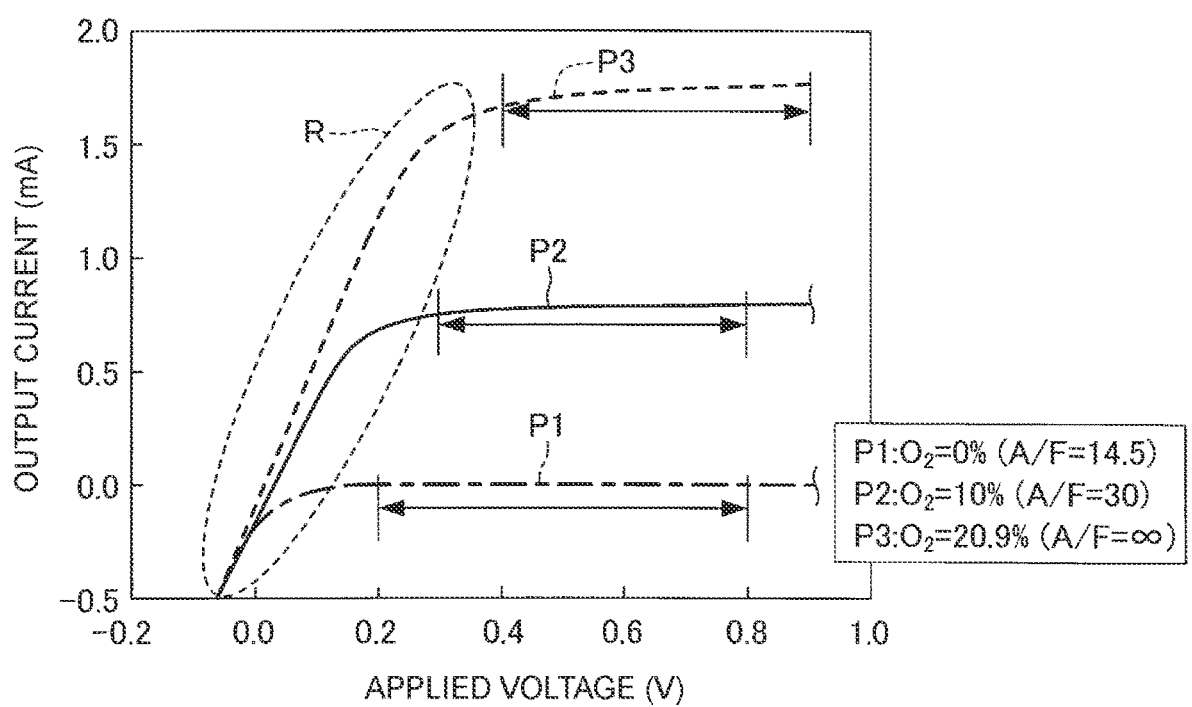
FIG. 6 is a graph that indicates a relationship between an A/F of air mixture in a combustion chamber and a limiting current range of oxygen.

At this time, this gas detector determines the voltage range of the applied voltage sweep (the lower limit voltage (the first voltage V1) and the upper limit voltage (the second voltage V2) of the applied voltage sweep) based on the engine air-fuel ratio A/F. More specifically, as shown in FIG. 6, the lower limit voltage of the applied voltage sweep is defined to avoid the detection of the output current Im that falls within an internal resistance dependence range surrounded by a dotted line R. This internal resistance dependence range is a region in which the output current Im is increased along with boosting of the applied voltage Vm (a region immediately before the output current Im reaches the limiting current range of oxygen). The upper limit voltage of the applied voltage Vm within the internal resistance dependence range (that is, the minimum value of the applied voltage Vm within the limiting current range of oxygen) is boosted as the engine air-fuel ratio A/F becomes leaner (the oxygen concentration in the exhaust gas is increased). While the upper limit voltage of the applied voltage sweep may be constant, the upper limit voltage of the applied voltage sweep is defined to be boosted as the lower limit voltage of the applied voltage sweep is boosted.

More specifically, the upper limit voltage of the applied voltage Vm within the internal resistance dependence range R is boosted as the engine air-fuel ratio A/F becomes leaner. Accordingly, this gas detector boosts the lower limit voltage (the first voltage V1) of the applied voltage sweep as the engine air-fuel ratio A/F becomes leaner so that the voltage range of the applied voltage sweep does not enter this internal resistance dependence range R.

As it is understood from FIG. 6, according to the experiment by the inventors, when A/F=14.5 (stoichiometric), the first voltage V1 has a value that is selected from 0.2 V or higher, and this gas detector sets the first voltage V1 at 0.2 V. When A/F=30, the first voltage V1 has a value that is selected from 0.3 V or higher, and this gas detector sets the first voltage V1 at 0.3 V. When A/F=infinity (the $O_2$ concentration=20.9%), the first voltage V1 has a value that is selected from 0.4 V or higher, and this gas detector sets the first voltage V1 at 0.4 V.

As it has already been described, in the case where SOx is contained in the exhaust gas when the boosting sweep and the lowering sweep are executed, S (sulfur), which is produced by the decomposition of SOx, is adsorbed to the first electrode 41a in the period during the boosting sweep. In the period during the lowering sweep, S that has been adsorbed to the first electrode 41a is reoxidized.

Figure 7A:
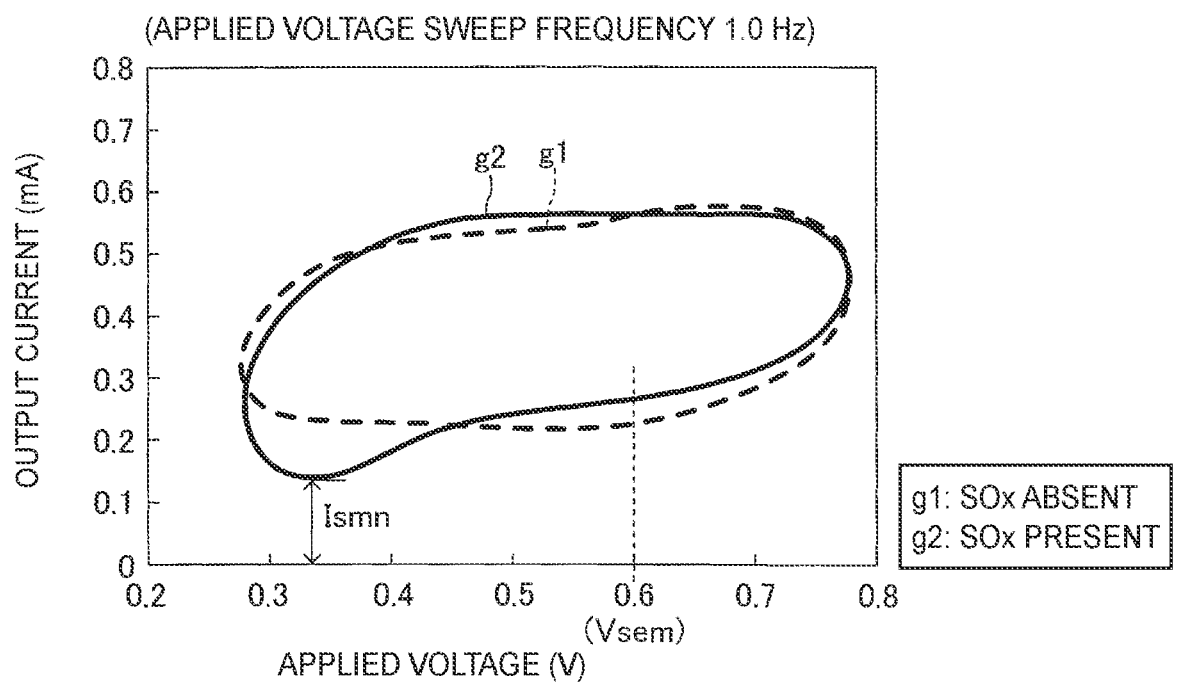
FIG. 7A is a graph that indicates a relationship between the applied voltage and the output current at a time when applied voltage sweep is executed.

This gas detector detects the reoxidation current change by using the above-described parameter(=the minimum current Ismn) and thereby determines whether sulfur oxides in the predetermined concentration or higher exist in the exhaust gas. That is, this gas detector executes the applied voltage sweep and, from the output current Im indicated by a line g2 in FIG. 7A, obtains the minimum value (the minimum current Ismn) of the output current Im at the time when the applied voltage Vm falls within the above-described detection voltage range during the lowering sweep. When SOx is contained in the exhaust gas, the degree of the above-described reoxidation current change appears significantly in comparison with the case where SOx is not contained in the exhaust gas. More specifically, when SOx is contained in the exhaust gas, as indicated by the line g2, the output current Im becomes smaller within the detection voltage range than that in the case where SOx is not contained in the exhaust gas as indicated by a line g1. In addition, as the SOx concentration in the exhaust gas is increased, the reoxidation current change becomes significant. Along with this, the minimum current Ismn is decreased. Thus, this gas detector obtains the minimum current Ismn as the parameter that represents the SOx concentration.

Just as described, according to this gas detector, the value (the minimum current Ismn) of the output current Im, which accurately represents the reoxidation current change required for the detection of the SOx concentration, is obtained. In this way, even when the actual voltage, at which the minimum current Ismn is generated, differs by various conditions (for example, the engine air-fuel ratio A/F, the applied voltage range, the sweeping rate, the sensor element temperature of the gas sensor 30, a characteristic change of the gas sensor 30 due to aging, and the like), the minimum current Ismn can reliably be obtained. Therefore, this gas detector can further accurately detect the SOx concentration.

Figure 7B:
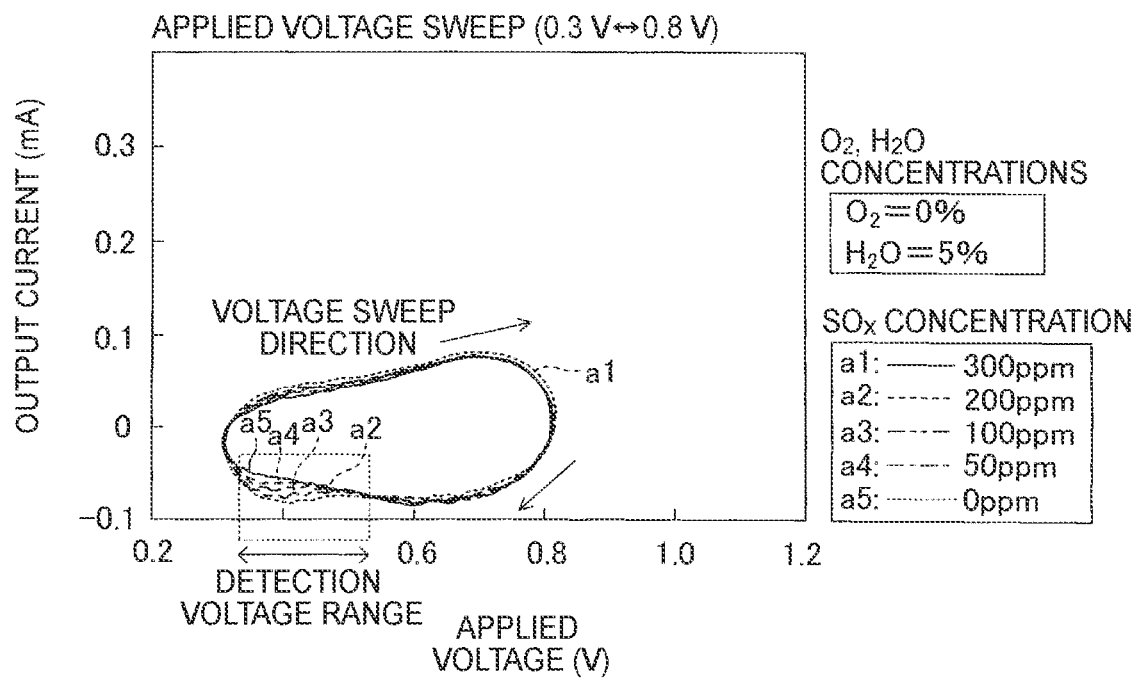
FIG. 7B is a graph that indicates a relationship between the applied voltage and the output current at the time when the applied voltage sweep is executed.

Furthermore, as shown in FIG. 7B, it has been found that the output current Im during the lowering sweep possibly has the minimum value regardless of a fact that it is considered that the reoxidation reaction does not occur in the case where the applied voltage Vm is a voltage (approximately 0.65 V in an example shown in FIG. 7B) that is higher than the decomposition initiation voltage of sulfur oxides. Accordingly, such a "minimum value of the output current Im in the case where the applied voltage Vm is higher than the above detection voltage range" is not the parameter that accurately represents the concentration of sulfur oxides. In other words, the minimum value of the output current Im during the lowering sweep is not the parameter that accurately represents the concentration of sulfur oxides. Here, FIG. 7B is a graph that indicates a relationship between the applied voltage and the output current in the case where the applied voltage sweep is executed at the different frequency from the frequency (1 Hz) of the applied voltage sweep in FIG. 7A. To handle this problem, this gas detector obtains the minimum value of the output current Im in a period in which the applied voltage Vm is the voltage that falls within the above-described detection voltage range (that is, the period in which the reoxidation reaction of sulfur is active), and obtains the minimum value of the output current Im as the parameter that represents the SOx concentration. In this way, based on the parameter, this gas detector can accurately determine whether SOx in the predetermined concentration or higher exists in the exhaust gas.

Next, a description will be made on specific actuation of this gas detector. Every time predetermined time elapses, the CPU of the ECU 20 (hereinafter simply referred to as the "CPU") uses the gas sensor 30 to execute a sensor activation determination routine, an A/F detection routine, and a SOx detection routine that are respectively shown in flowcharts of FIG. 8 to FIG. 10.

Note that a "value of an A/F detection request flag Xaf and a value of a SOx detection request flag Xs" that are used in these routines are set to "0" in an initial routine executed by the CPU when an ignition key switch, which is not shown and is mounted on the vehicle, is switched from an OFF position to an ON position.

Figure 8:
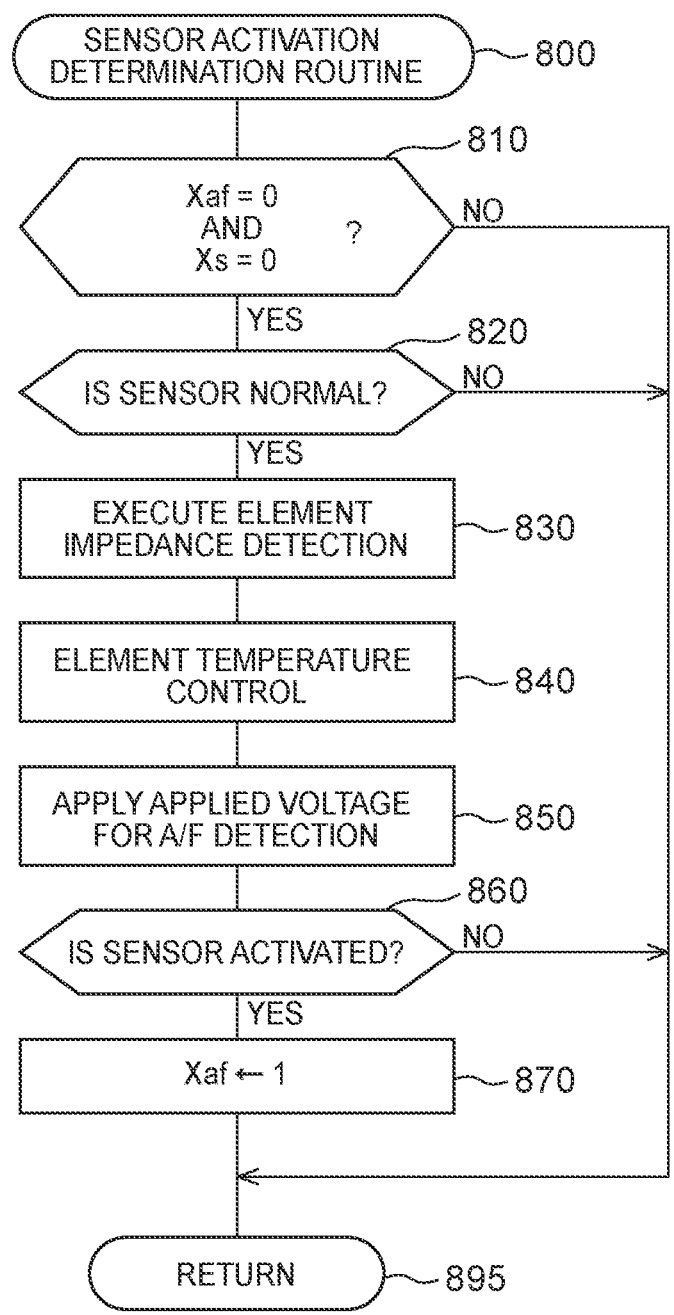
FIG. 8 is a flowchart of a sensor activation determination routine that is executed by a CPU of an ECU shown in FIG. 1.

At predetermined timing, the CPU starts processing from step 800 of the sensor activation determination routine shown in FIG. 8. Then, the processing proceeds to step 810, and the CPU determines whether both of the value of the A/F detection request flag Xaf and the value of the SOx detection request flag Xs are "0".

If a current time point is a time point immediately after the ignition key switch is switched to the ON position (immediately after the internal combustion engine 10 is started), both of the value of the A/F detection request flag Xaf and the value of the SOx detection request flag Xs are "0". Accordingly, the CPU determines "Yes" in step 810, and the processing proceeds to step 820. Then, the CPU determines whether the gas sensor 30 is normal by a well-known method. For example, the CPU determines that the gas sensor 30 is abnormal in the cases where the A/F is being detected during the last operation of the internal combustion engine 10 and the output current Im is not changed when an operation state of the internal combustion engine 10 is changed from a fuel injection state to a fuel cut state. Then, the CPU stores the determination in the backup RAM that can retain stored information even when the ignition key switch is OFF. Based on the stored information in the backup RAM, the CPU determines whether the gas sensor 30 is normal in step 820 of this routine.

If the gas sensor 30 is normal, the CPU determines "Yes" in step 820, and the processing proceeds to step 830. Then, the CPU detects element impedance for element temperature control (internal resistance of the solid electrolyte body 41s) based on the output current Im at the time when a high-frequency voltage is applied between the first electrode 41a and the second electrode 41b (for example, see Japanese Patent Application Publication No. 10-232220 (JP 10-232220 A) and Japanese Patent Application Publication No. 2002-71633 (JP 2002-71633 A)).

Thereafter, after the CPU sequentially executes the processing in step 840 and step 850, which will be described below, the processing proceeds to step 860. Step 840: the CPU executes heater energization control by target impedance feedback. That is, the CPU controls the energization of the heater 71 such that the element impedance, which is obtained as temperature information in step 830, matches target impedance set in advance (for example, see JP 2002-71633 A and Japanese Patent Application Publication No. 2009-53108 (JP 2009-53108 A)). Step 850: the CPU applies the applied voltage (more specifically, 0.3 V) for the oxygen concentration detection (that is, for A/F detection) between the first electrode 41a and the second electrode 41b. That is, the CPU sets the applied voltage Vm to the applied voltage for the detection of the oxygen concentration.

When the processing proceeds to step 860, the CPU determines whether the gas sensor 30 is activated (whether the sensor is activated). More specifically, the CPU determines whether the temperature of the solid electrolyte body 41s, which is estimated based on the element impedance obtained in step 830, is equal to or higher than an activation temperature threshold. If the gas sensor 30 is not activated, the CPU determines "No" in step 860. Then, the processing proceeds to step 895, and this routine is terminated once.

On the other hand, if the gas sensor 30 is activated, the CPU determines "Yes" in step 860. Then, the processing proceeds to step 870, and the CPU sets the value of the A/F detection request flag Xaf to "1". Thereafter, the processing proceeds to step 895, and this routine is terminated once.

Note that, if either one of the value of the A/F detection request flag Xaf and the value of the SOx detection request flag Xs is not "0" at the time point at which the CPU executes the processing in step 810, the CPU determines "No" in step 810. Then, the processing proceeds to step 895, and this routine is terminated once. In addition, if the gas sensor 30 is not normal at the time point at which the CPU executes the processing in step 820, the CPU determines "No" in step 820. Then, the processing proceeds to step 895, and this routine is terminated once.

Next, a description will be made on the A/F detection routine with reference to FIG. 9. At predetermined timing, the CPU starts processing from step 900 in FIG. 9. Then, the processing proceeds to step 910, and the CPU determines whether the value of the A/F detection request flag Xaf is "1".

The A/F detection routine substantially functions in the case where the SOx detection request flag Xs is OFF (Xs=0) after the time point at which the gas sensor 30 is activated and the value of the A/F detection request flag Xaf is set to "1", onward. Accordingly, if the value of the A/F detection request flag Xaf is not "1" (that is, if the value of the A/F detection request flag Xaf is "0"), the CPU determines "No" in step 910. Then, the processing proceeds to step 995, and this routine is terminated once.

On the other hand, if the value of the A/F detection request flag Xaf is set to "1" by the processing in step 870 of FIG. 8, the CPU determines "Yes" in step 910, and the processing proceeds to step 920. Then, the CPU obtains the output current Im (that is, the limiting current value for oxygen in the exhaust gas) from the gas sensor 30, detects the oxygen concentration by applying the output current Im to a predetermined lookup table (also referred to as a "map"), and computes the engine air-fuel ratio A/F by applying the oxygen concentration to the predetermined lookup table. Note that, if the applied voltage Vm is not set to the applied voltage for the oxygen concentration detection at the time when the processing in step 920 is executed (for example, if the SOx detection routine in FIG. 10, which will be described below, has been terminated), the CPU sets the applied voltage Vm to the applied voltage for the oxygen concentration detection and then obtains the output current Im.

Thereafter, the processing proceeds to step 930, and the CPU determines whether all conditions that constitute the following SOx detection condition are satisfied based on information obtained from the various sensors (the NE sensor 21, the coolant temperature sensor 22, and the like). The SOx detection condition is established when all of the following conditions are satisfied.

Next, a description will be made on the SOx detection condition. The internal combustion engine 10 is in a state after being warmed (that is, the coolant temperature THW is equal to or higher than a warming coolant temperature THWth). The gas sensor 30 is activated. The state is not the fuel cut state. The engine air-fuel ratio A/F is stable. That is, the operation state of the internal combustion engine 10 is an idling state, or a driving state of the vehicle is a steady traveling state. Note that whether the operation state of the internal combustion engine 10 is the idling state is determined by determining whether "states where the accelerator pedal operation amount AP is "0" and the engine speed NE is equal to or lower than a predetermined speed" continue for predetermined idling time or longer. Whether the driving state of the vehicle is the steady traveling state is determined by determining whether "states where a change amount of the accelerator pedal operation amount AP per unit time is equal to or smaller than a threshold operation change amount and a change amount of a vehicle speed, which is detected by an unillustrated vehicle speed sensor, per unit time is equal to or smaller than a threshold vehicle speed change amount" continue for a predetermined steady traveling threshold time or longer. Note that, as the condition that constitutes the SOx detection condition, the following condition may be added. The "detection of the SOx concentration (the determination on whether sulfur oxides in the predetermined concentration or higher exist in the exhaust gas)" has never been made before the ignition key switch is switched to the OFF position after being switched from the OFF position to the ON position (that is, after the start of the internal combustion engine 10 of this time).

If the SOx detection condition is established, the CPU determines "Yes" in step 930 and sequentially executes processing in step 940 to step 960, which will be described below. Thereafter, the processing proceeds to step 995, and this routine is terminated once.

Step 940: the CPU obtains the A/F that is computed in step 920. Step 950: the CPU determines the voltage range of the applied voltage sweep (the lower limit voltage (the first voltage V1) and the upper limit voltage (the second voltage V2)) by applying the obtained A/F to a lookup table M1. Step 960: the CPU sets the value of the A/F detection request flag Xaf to "0" and sets the value of the SOx detection request flag Xs to "1".

On the other hand, if at least one of the conditions that constitute the SOx detection condition is not satisfied, the CPU determines "No" in step 930. Then, the processing proceeds to step 995, and this routine is terminated once.

Figure 10:
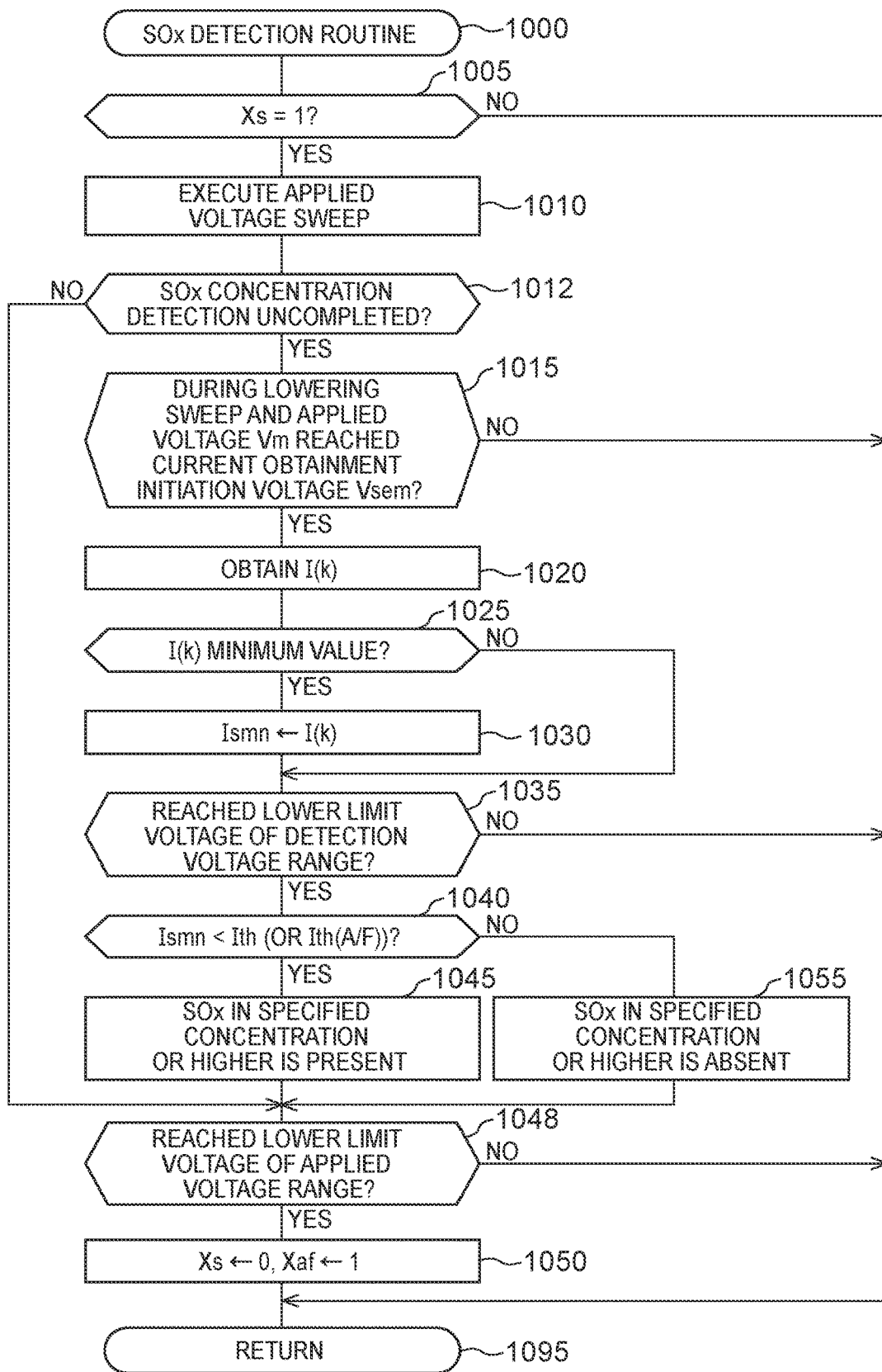
FIG. 10 is a flowchart of a SOx detection routine that is executed by the CPU of the ECU shown in FIG. 1.

A description will hereinafter be made on the SOx detection routine with reference to FIG. 10. The CPU executes the SOx detection routine, which is shown in the flowchart of FIG. 10, every time constant sampling time Δt (2 ms in this example) elapses. At predetermined timing, the CPU starts processing from step 1000 in FIG. 10. Then, the processing proceeds to step 1005, and the CPU determines whether the value of the SOx detection request flag Xs is "1".

The SOx detection routine substantially functions in the case where the above-described SOx detection condition is established (that is, in the case where the SOx detection request flag Xs is ON (Xs=1)). Accordingly, if the value of the SOx detection request flag Xs is not "1" (that is, the value of the SOx detection request flag Xs is "0"), the CPU determines "No" in step 1005. Then, the processing proceeds to step 1095, and this routine is terminated once.

Figure 9:
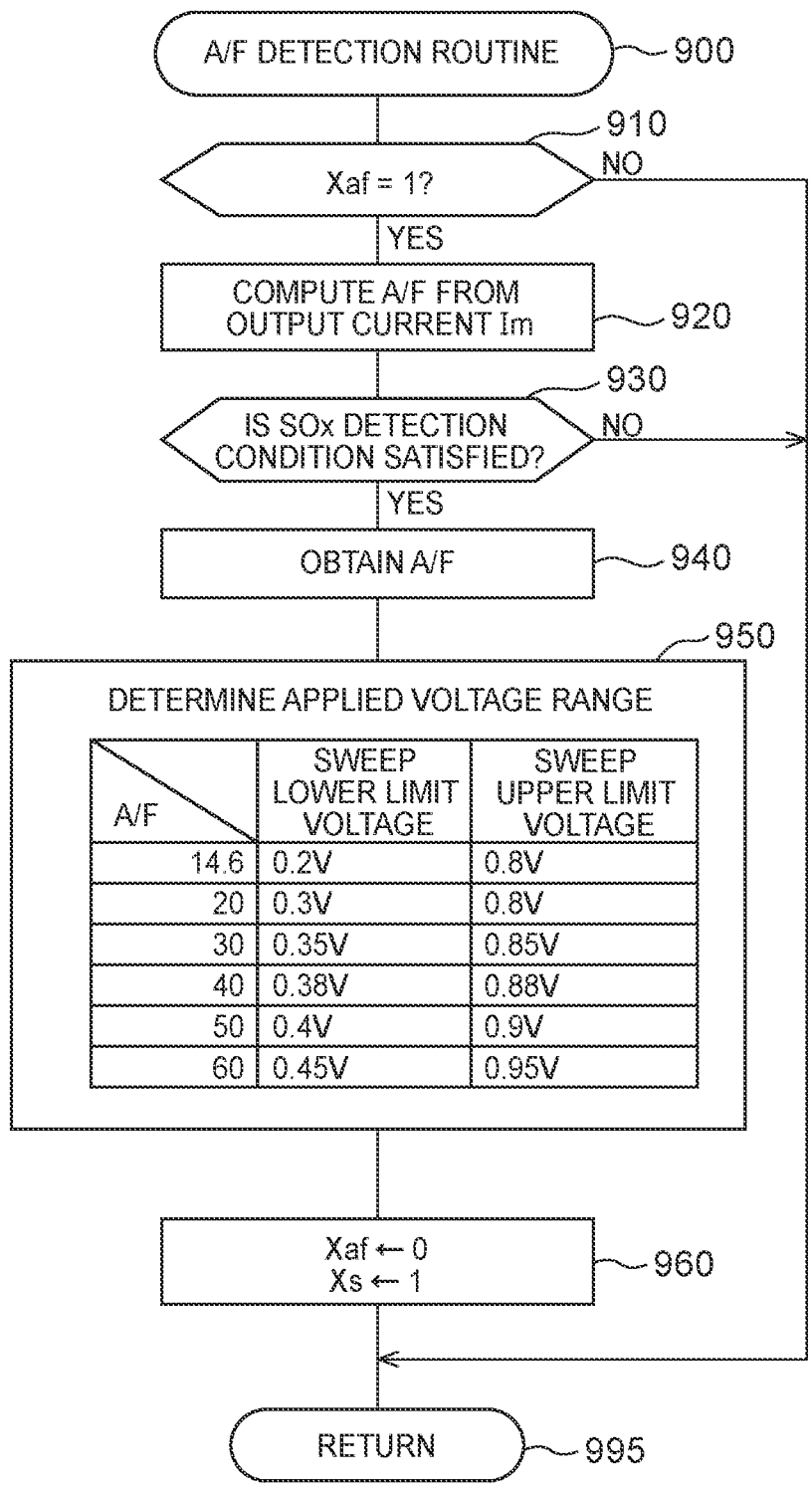
FIG. 9 is a flowchart of an A/F detection routine that is executed by the CPU of the ECU shown in FIG. 1.

On the other hand, if the value of the SOx detection request flag Xs is set to "1" by the processing in step 960 of FIG. 9, the CPU determines "Yes" in step 1005, and the processing proceeds to step 1010. Then, the CPU starts the applied voltage sweep (more specifically, processing to apply the voltage in the sine waveform (a frequency of 1 Hz, for one cycle)) at the predetermined sweeping rate within the applied voltage range determined in step 950. In this applied voltage sweep, the boosting sweep is executed first, and the lowering sweep is then executed. Note that, if the applied voltage sweep is already being executed at a time point of the processing in step 1010, the CPU continues executing the applied voltage sweep.

Thereafter, the processing proceeds to step 1012, and the CPU determines whether the detection of the SOX concentration is uncompleted. If the detection of the SOX concentration is uncompleted, the CPU determines "Yes" in step 1012. Then, the processing proceeds to step 1015, and the CPU determines whether the current time point is a time point during the lowering sweep and whether the applied voltage Vm has reached the current obtainment initiation voltage Vsem (the third voltage V3). If the determination condition in this step 1015 is not established, the CPU determines "No" in step 1015. Then, the processing directly proceeds to step 1095, and this routine is terminated once.

On the other hand, if the determination condition in this step 1015 is established, the CPU determines "Yes" in step 1015. Then, the processing proceeds to step 1020, and the CPU obtains the output current Im(=I(k)) at the current time point. Thereafter, the processing proceeds to step 1025, and the CPU determines whether the output current I(k), which is obtained in step 1020, has a minimum value of the "output currents I(k) that are obtained by the processing in step 1020 at the time when this routine is executed after the initiation of the currently-executed applied voltage sweep and by the processing in step 1020 at the time when this routine is executed last time". That is, the CPU determines whether I(k)<the minimum current Ismn.

If the output current I(k), which is obtained in step 1020 of this routine, has the minimum value, the CPU determines "Yes" in step 1025. Then, the processing proceeds to step 1030. After the CPU updates the minimum current Ismn to the output current I(k), the processing proceeds to step 1035. If the output current I(k), which is obtained in step 1020 of this routine, does not have the minimum value, the CPU determines "No" in step 1025. Then, the processing directly proceeds to step 1035.

In step 1035, the CPU determines whether the applied voltage Vm has reached the lower limit voltage (the fourth voltage V4) of the above-described detection voltage range.

If the applied voltage Vm has not reached the lower limit voltage of the above-described detection voltage range, the CPU determines "No" in step 1035. Then, the processing proceeds to step 1095, and this routine is terminated once.

On the other hand, if the applied voltage Vm has reached the lower limit voltage (the fourth voltage V4) of the above-described detection voltage range, the CPU determines "Yes" in step 1035. Then, the processing proceeds to step 1040, and the CPU determines whether the minimum current Ismn is smaller than a threshold (a threshold minimum current) Ith. The threshold minimum current Ith is an appropriate value for the determination on whether SOx in the predetermined concentration or higher is contained in the exhaust gas, and is identified by an experiment or the like in advance. That is, sulfur (S) in an upper limit concentration within a permissible range is mixed in the fuel, and the threshold minimum current Ith at the time when the applied voltage sweep is executed under the same condition as described above (the same condition as that in the case where the SOx concentration in the exhaust gas is actually detected) is set as the minimum value of the output current Im within the detection voltage range during the lowering sweep. Note that the same condition in this case is that the voltage waveform of the applied voltage sweep, the applied voltage range of the applied voltage sweep, the sweeping rate of the applied voltage sweep, the detection voltage range, and the like are the same.

Note that the CPU may change a value of the threshold minimum current Ith in accordance with the A/F, which is obtained in step 940 of FIG. 9. More specifically, the CPU may change the threshold minimum current Ith such that the threshold minimum current Ith is increased as the air-fuel ratio A/F, which is obtained by the processing in step 920 and step 940, becomes leaner. A reason therefor is as follows.

As the engine air-fuel ratio A/F becomes leaner, the more oxide ions move from the first electrode 41a to the second electrode 41b due to the reductive decomposition of oxygen (oxygen molecules ($O_2$)) in the exhaust gas. As a result, the output current Im is increased. In some embodiments, the threshold minimum current Ith is changed with this increase in the output current Im taken into consideration. In this way, regardless of the engine air-fuel ratio A/F, it is possible to "further accurately" determine whether SOx in the "predetermined concentration" is contained in the exhaust gas. In this case, the CPU may determine the threshold minimum current Ith per A/F by applying the A/F, which is obtained by the processing in step 920 and step 940, to the predetermined lookup table.

Note that, in step 1040, the CPU may fix the value of the threshold minimum current Ith instead of changing the value of the threshold minimum current Ith based on the air-fuel ratio A/F, and may correct the minimum current Ismn based on the "air-fuel ratio A/F obtained in step 940 (or the output current Im obtained in step 920)" at a time point before the processing in step 1040 is executed.

More specifically, the CPU computes the threshold minimum current Ith for the exhaust gas at the particular air-fuel ratio A/F and uses the threshold minimum current Ith in step 1040.

Furthermore, the CPU corrects the minimum current Ismn such that the minimum current Ismn is decreased as the air-fuel ratio A/F obtained in step 920 and step 940 (or the limiting current value) is increased within a range that is higher than the particular air-fuel ratio A/F (or the limiting current value of oxygen that corresponds to the particular air-fuel ratio A/F).

Moreover, the CPU may correct the minimum current Ismn such that the minimum current Ismn is increased as the air-fuel ratio A/F obtained in step 920 and step 940 (or the limiting current value) is decreased within a range that is lower than the particular air-fuel ratio A/F (or the limiting current value of oxygen that corresponds to the particular air-fuel ratio A/F), and may use the corrected minimum current Ismn for a comparison with the threshold minimum current Ith in step 1040.

In this case, the CPU stores a lookup table that defines a correction amount AI of the minimum current Ismn with respect to a combination of the air-fuel ratio A/F (or the output current Im as the limiting current value of oxygen) and the minimum current Ismn in the ROM. Then, the CPU applies the "air-fuel ratio A/F (or the limiting current value", which is obtained in step 920 and step 940, to the lookup table and thereby computes the actual correction amount AI. In this way, the CPU can use a corrected value of the minimum current Ismn by the correction amount AI for the comparison in step 1040.

If the minimum current Ismn is smaller than the threshold minimum current Ith, the reoxidation current change is significant. Accordingly, the CPU determines "Yes" in step 1040, and the processing proceeds to step 1045. Then, the CPU determines that SOx in the predetermined concentration or higher is contained in the exhaust gas. At this time, the CPU may store that SOx in the predetermined concentration or higher is contained in the exhaust gas (or S exceeding a permissible value is mixed in the fuel) in the backup RAM and may turn on a predetermined warning lamp.

Thereafter, the processing proceeds to step 1048, and the CPU determines whether the applied voltage Vm has reached the lower limit voltage (the first voltage V1) of the voltage range of the applied voltage sweep (in other words, whether the current time point is a time point at which the current lowering sweep is terminated). If the applied voltage Vm has not reached the lower limit voltage of the applied voltage range, the CPU determines "No" in step 1048. Then, the processing proceeds to step 1095, and this routine is terminated once. Note that, if the SOx detection routine is executed immediately thereafter, the detection of the SOx concentration is completed (the detection of the SOx concentration is not incomplete). Thus, the CPU determines "No" in step 1012. Then, the processing proceeds to step 1048, and the CPU executes the processing in step 1048.

If the applied voltage Vm has reached the lower limit voltage of the applied voltage range at the time point at which the processing in step 1048 is executed, the CPU determines "Yes" in step 1048. Then, the processing proceeds to step 1050, and the CPU sets the value of the SOx detection request flag Xs to "0" and sets the value of the A/F detection request flag Xaf to "1". Thereafter, the processing proceeds to step 1095, and this routine is terminated once.

On the other hand, if the minimum current Ismn is not lower than the threshold minimum current Ith, the CPU determines "No" in step 1040. Then, the processing proceeds to step 1055, and the CPU determines that SOx in the predetermined concentration or higher is not contained in the exhaust gas. At this time, the CPU may store that SOx in the predetermined concentration or higher is not contained in the exhaust gas (or S exceeding the permissible value is not mixed in the fuel) in the backup RAM and may turn off the predetermined warning lamp. Thereafter, the processing proceeds to step 1048, and in accordance with the determination result of step 1048, the processing directly proceeds to step 1095, and this routine is terminated once. Alternatively, the processing proceeds to step 1095 via step 1050, and this routine is terminated once.

As it has been described so far, the ECU 20 of this gas detector is configured to obtain the minimum current Ismn at the time when the applied voltage Vm falls within the detection voltage range during the lowering sweep as the "parameter representing the degree of the reoxidation current change of sulfur" that is less likely to be influenced by the oxygen containing components other than SOx in the exhaust gas. Then,' the ECU 20 of this gas detector is configured to determine whether SOx in the predetermined concentration or higher is contained in the exhaust gas based on the obtained minimum current Ismn. At the time, the ECU 20 appropriately sets the sweeping rate of the lowering sweep, the voltage range of the applied voltage sweep, and the like such that the large degree of the reoxidation current change appears. Then, the ECU 20 obtains the minimum current Ismn.

That is, the ECU 20 is configured to determine that SOx in the predetermined concentration or higher is contained in the exhaust gas if the minimum current Ismn is lower than the threshold minimum current Ith, and is configured to determine that SOx in the predetermined concentration or higher is not contained in the exhaust gas if the minimum current Ismn is equal to or larger than the threshold minimum current Ith. Thus, the ECU 20 can accurately determine the presence or the absence of SOx in the predetermined concentration or higher contained in the exhaust gas.

The specific description has been made so far on the embodiment of the disclosure. However, the disclosure is not limited to the above-described embodiment, and various modified examples that are based on the technical idea of the disclosure can be adopted.

For example, in the above-described embodiment, the presence or the absence of SOx in the predetermined concentration or higher in the exhaust gas is determined by comparing the minimum current Ismn and the threshold minimum current Ith. However, the SOx concentration in the exhaust gas may be detected based on the minimum current Ismn.

Figure 11:
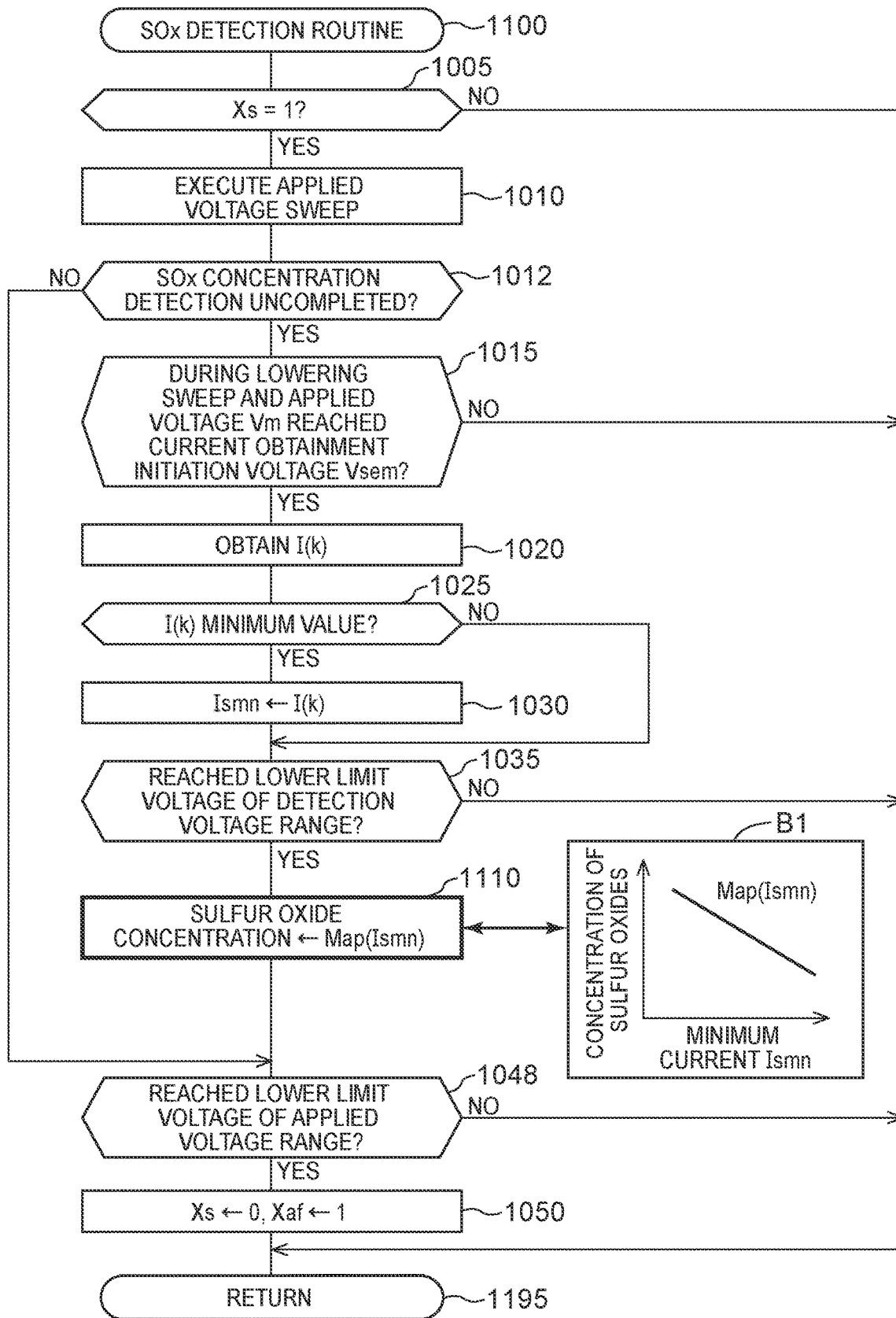
FIG. 11 is a flowchart of a SOx detection routine that is executed by a CPU of an ECU according to a modified example of the gas detector shown in FIG. 1.

More specifically, instead of the SOx concentration detection routine shown in FIG. 10, the CPU can be configured to execute a SOx concentration detection routine shown in FIG. 11. This routine shown in FIG. 11 is a routine in which processing in "step 1110" is executed instead of the processing in "step 1040, step 1045, and step 1055" of the routine shown in FIG. 10. Thus, a description will hereinafter be made on the processing in step 1110 in FIG. 11. Step 1110: the CPU applies the minimum current Ismn to a lookup table Map(Ismn) and thereby obtains the SOx concentration in the exhaust gas. Note that the ROM (the memory section) of the ECU 20 stores a "relationship between the minimum current Ismn and the SOx concentration in the exhaust gas" as the lookup table Map(Ismn) (see a block B1 in FIG. 11). This lookup table can be obtained by an experiment or the like in advance.

This lookup table Map(Ismn) may be a lookup table Map(Ismn, A/F) that defines a relationship among the "engine air-fuel ratio A/F, the minimum current Ismn, and the concentration of sulfur oxides in the exhaust gas" (see FIG. 12). In this case, the CPU may apply the actual minimum current Ism, which is obtained in step 1030 of FIG. 10, and the air-fuel ratio A/F, which is obtained in step 940 of FIG. 9, to the lookup table Map(Ismn, A/F) and thereby compute the concentration of sulfur oxides in the exhaust gas.

According to the above, regardless of the engine air-fuel ratio A/F during the detection of the SOx concentration, the SOx concentration can accurately be detected.

For example, in the above-described embodiment, the CPU determines "the lower limit voltage and the upper limit voltage of the voltage range in the applied voltage sweep" based on the obtained A/F in "step 940 and step 950" of FIG. 9. However, the following may be adopted.

More specifically, the CPU may obtain the oxygen concentration based on the "output current Im in the case where the applied voltage Vm is set to the applied voltage for the oxygen concentration detection" in step 920, and may determine the "lower limit voltage and the upper limit voltage of the voltage range of the applied voltage sweep" based on the oxygen concentration in step 950. In this case, the lookup table Ml is a table that defines a relationship between the oxygen concentration and a combination of the "lower limit voltage and the upper limit voltage of the voltage range of the applied voltage sweep".

Similarly, the CPU may obtain the "output current Im in the case where the applied voltage Vm is set to the applied voltage for the oxygen concentration detection" in step 920, and may determine the "lower limit voltage and the upper limit voltage of the voltage range of the applied voltage sweep" based on the output current Im in step 950. In this case, the lookup table Ml is the table that defines the relationship between the output current Im and the combination of the "lower limit voltage and the upper limit voltage of the voltage range of the applied voltage sweep".

In the processing of step 920 and step 940 in FIG. 9, the CPU may determine the "threshold minimum current Ith" based on the "oxygen concentration that is detected based on the output current Im in the case where the applied voltage Vm is set to the applied voltage for the oxygen concentration detection". In this case, the lookup table, which the CPU refers in step 940, is a table that defines a relationship between the oxygen concentration and the "threshold minimum current Ith".

In the processing of step 920 and step 940 in FIG. 9, the CPU may determine the "threshold minimum current Ith" based on the "output current Im itself in the case where the applied voltage Vm is set to the applied voltage for the oxygen concentration detection". In this case, the lookup table, which the CPU refers in step 940, is a table that defines a relationship between the output current Im and the threshold minimum current Ith.

For example, in order to further reliably obtain the minimum current Ismn that represents the reoxidation current change, the current obtainment initiation voltage Vsem may be determined as follows. That is, the current obtainment initiation voltage Vsem may be determined to be a value that is lower than the SOx decomposition initiation voltage (0.6 V) so that the minimum current Ismn is obtained within such a voltage range that the change in the output current Im (the reoxidation current change) associated with the "S reoxidation reaction" appears during the applied voltage sweep. More specifically, the current obtainment initiation voltage Vsem may be selected from a range that is higher than the lower limit voltage (the first voltage V1) of the voltage range of the applied voltage sweep and that is lower than the SOx decomposition initiation voltage (0.6 V), and may be selected from a range between more than the first voltage V1 and not more than 0.45 V.

For example, the voltage waveform of the applied voltage sweep is not limited to the waveforms shown in FIG. 3B and FIG. 3C. The voltage waveform of the applied voltage sweep may be an arbitrary waveform (for example, a triangular wave) as long as the reoxidation current change resulted from the reoxidation reaction of sulfur adsorbed to the first electrode 41a becomes extremely significant from a certain time point of the lowering sweep by appropriately setting the lowering rate.

In addition, in step 1110 of FIG. 11, the CPU of the modified example may apply the minimum current Ismn and an air-fuel ratio correlation value SAF, which is correlated with the internal combustion engine air-fuel ratio A/F obtained in step 920 and step 940 of FIG. 9, (this air-fuel ratio A/F itself, the oxygen concentration in the exhaust gas as a basis of the computation of this air-fuel ratio A/F, or the limiting current value as the output current Im corresponding to the oxygen concentration and as the output current Im obtained in step 920) to a lookup table Map(Ismn, SAF) shown in FIG. 12, and may thereby obtain the SOx concentration in the exhaust gas. With such a configuration, regardless of the engine air-fuel ratio A/F during the detection of the SOx concentration, the SOx concentration can further accurately be detected.

What is claimed is:

1. A gas detector comprising:
   an electrochemical cell provided in an exhaust passage of an internal combustion engine and including a solid electrolyte body, a first electrode and a second electrode, the solid electrolyte body having oxide ion conductivity, and the first electrode and the second electrode being provided on each of surfaces of the solid electrolyte body;
   a diffusion resistance body formed of a porous material through which exhaust gas flowing through the exhaust passage can pass;
   an element section configured to make the exhaust gas flowing through the exhaust passage reach the first electrode through the diffusion resistance body;
   a power supply circuit configured to apply a voltage between the first electrode and the second electrode;
   a current detection sensor configured to detect an output current as a current flowing between the first electrode and the second electrode; and
   an electronic control unit configured to:
   (i) control an applied voltage as the voltage applied between the first electrode and the second electrode by using the power supply circuit,
   (ii) obtain the output current by using the current detection sensor,
   (iii) determine whether sulfur oxides in a predetermined concentration or higher are contained in the exhaust gas or detect a concentration of sulfur oxides in the exhaust gas based on the obtained output current,
   (iv) execute a boosting sweep for boosting the applied voltage from a first voltage to a second voltage by using the power supply circuit when an air-fuel ratio of air mixture supplied to the internal combustion engine is in a stable state, the first voltage being selected from a first voltage range that is lower than a decomposition initiation voltage of sulfur oxides, and the second voltage being selected from a second voltage range that is higher than the decomposition initiation voltage of sulfur oxides,
   (v) execute a lowering sweep for lowering the applied voltage from the second voltage to the first voltage at a predetermined lowering rate after executing the boosting sweep, and obtain a parameter that is correlated with a degree of a change in the output current resulted resulting from a current flowing between the first electrode and the second electrode due to a reoxidation reaction of sulfur, which has been adsorbed to the first electrode, leading to return to the sulfur oxides in the first electrode at a time when the applied voltage becomes lower than the decomposition initiation voltage of sulfur oxides during the lowering sweep, and the change being increased as the concentration of sulfur oxides contained in the exhaust gas is increased,
   (vi) determine whether the sulfur oxides in the predetermined concentration or higher are contained in the exhaust gas or detect the concentration of sulfur oxides in the exhaust gas based on the parameter,
   (vii) set the predetermined lowering rate to such a rate that a rate of the reoxidation reaction becomes a rapidly increased rate at a time point at which the applied voltage becomes a voltage that falls within the first voltage range and falls within a higher voltage range than the first voltage, and
   (viii) use, as the parameter, a minimum value of the output current obtained by the current detection sensor in a period in which the lowering sweep is executed and in which the applied voltage is a voltage within a detection voltage range between not less than a fourth voltage and not more than a third voltage, the third voltage being equal to or lower than the decomposition initiation voltage of sulfur oxides, and the fourth voltage being higher than the first voltage.

2. The gas detector according to claim 1, wherein the electronic control unit is configured to:
   (i) execute the determination whether the sulfur oxides in the predetermined concentration or higher are contained in the exhaust gas,
   (ii) determine whether the minimum value is smaller than a predetermined threshold,
   (iii) determine that the sulfur oxides, whose concentration in the exhaust gas is the predetermined concentration or higher, are contained in the exhaust gas when determining that the minimum value is smaller than the threshold, and
   (iv) determine that the sulfur oxides in the predetermined concentration or higher are not contained in the exhaust gas when determining that the minimum value is equal to or larger than the threshold.

3. The gas detector according to claim 2, wherein the electronic control unit is configured to:
   (i) set the applied voltage to an air-fuel ratio detection applied voltage by using the power supply circuit before making the determination, the air-fuel ratio detection applied voltage being selected from a range where a limiting current of oxygen is generated,
   (ii) obtain the output current as a limiting current value for oxygen contained in the exhaust gas by using the current detection sensor when the applied voltage is set to the air-fuel ratio detection applied voltage, and
   (iii) execute at least one of a changing of the threshold based on the obtained limiting current value and a correction of the minimum value based on the limiting current value that is obtained at a time point before the determination on whether the minimum value is smaller than the threshold.

4. The gas detector according to claim 3, wherein the current detection sensor is an ammeter.

5. The gas detector according to claim 2, wherein the current detection sensor is an ammeter.

6. The gas detector according to claim 1, wherein the electronic control unit is configured to:
(i) execute the detection of the concentration of sulfur oxides in the exhaust gas, and
(ii) detect the concentration of sulfur oxides in the exhaust gas based on the minimum value.

7. The gas detector according to claim 6, wherein the current detection sensor is an ammeter.

8. The gas detector according to claim 1, wherein the electronic control unit is configured to:
(i) execute the detection of the concentration of sulfur oxides in the exhaust gas,
(ii) set the applied voltage to an air-fuel ratio detection applied voltage by using the power supply circuit before detecting the concentration of sulfur oxides, the air-fuel ratio detection applied voltage being selected from a range where a limiting current of oxygen is generated,
(iii) obtain the output current as a limiting current value for oxygen contained in the exhaust gas by using the current detection sensor when the applied voltage is set to the air-fuel ratio detection applied voltage, and
(iv) detect the concentration of sulfur oxides in the exhaust gas based on the minimum value, which is obtained as the parameter, and the obtained limiting current value for oxygen.

9. The gas detector according to claim 8, wherein the current detection sensor is an ammeter.

10. The gas detector according to claim 1, wherein the current detection sensor is an ammeter.

* * * * *